United States Patent
Dressel et al.

[15] 3,658,222
[45] Apr. 25, 1972

[54] PIPE TENSIONING APPARATUS

[72] Inventors: Edwin J. Dressel; Warren A. Petrie, both of New Orleans; Clarence W. Shaw, Metairie, all of La.; Janis Grinbergs, Seattle, Wash.; John E. Isakson, Stanwood, Wash.; Martin C. Adams, Lynwood, Wash.

[73] Assignee: J. Ray McDermott & Co., Inc., New Orleans, La.

[22] Filed: Oct. 21, 1970

[21] Appl. No.: 82,851

Related U.S. Application Data

[63] Continuation of Ser. No. 823,107, May 8, 1969, abandoned.

[52] U.S. Cl................................226/25, 226/35, 226/108, 226/188, 226/176, 226/195, 61/72.3
[51] Int. Cl............................................B63b 35/04
[58] Field of Search...............226/25, 195, 188, 108, 176, 226/177, 11, 35; 61/72.3; 254/172, 175.5

[56] References Cited

UNITED STATES PATENTS

| | | | |
|---|---|---|---|
| 3,473,715 | 10/1969 | Shuey, Jr. | 226/188 X |
| 3,506,174 | 4/1970 | Shuey, Jr. | 226/188 X |
| 3,533,244 | 10/1970 | Shaw | 226/195 X |

*Primary Examiner*—Allen N. Knowles
*Attorney*—Arnold, Roylance, Kruger & Durkee

[57] ABSTRACT

A novel pipe tensioning device has a series of independently driven traction wheels disposed radially about the pipe at a number of longitudinally arranged traction stations. The wheels at each station may be retracted from or placed into engagement with the pipe to permit repair of passage of a field joint. The pipe tensioner carriage is mounted to bear against preloaded load cells in the pipelaying direction. These load cells function in an electronic system for sensing and regulating tension to a desired value.

32 Claims, 19 Drawing Figures

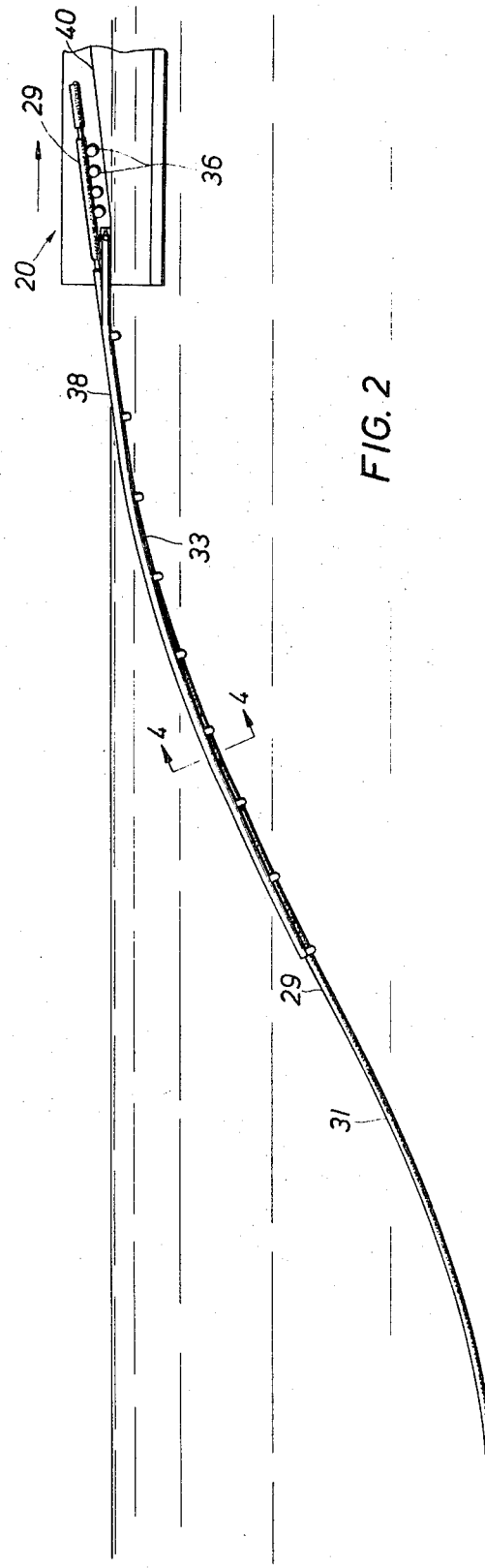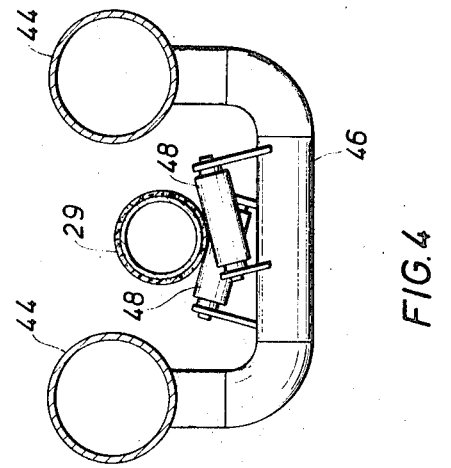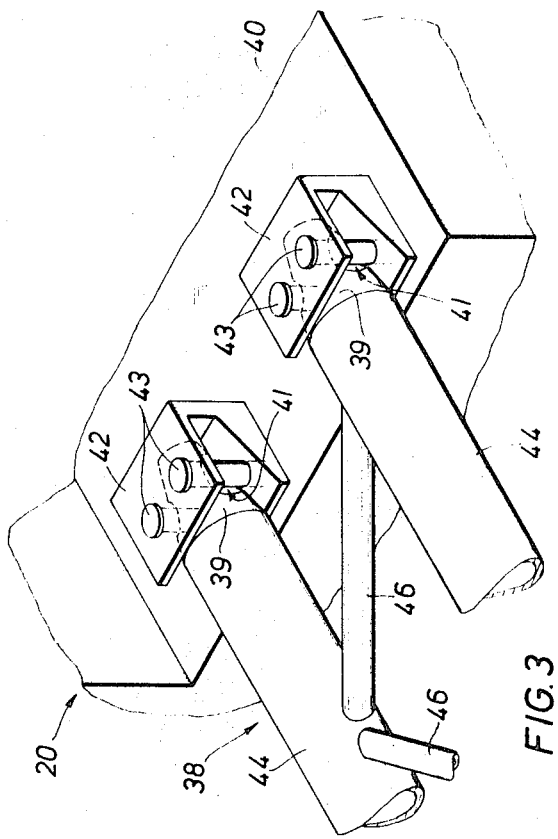
FIG. 2
FIG. 4
FIG. 3
Edwin J. Dressel, Warren A. Petrie
Clarence W. Shaw, John E. Isakson
Martin L. Adams, Janis Grinbergs
INVENTORS
BY Arnold, Roylance,
Kruger & Durkee
ATTORNEYS

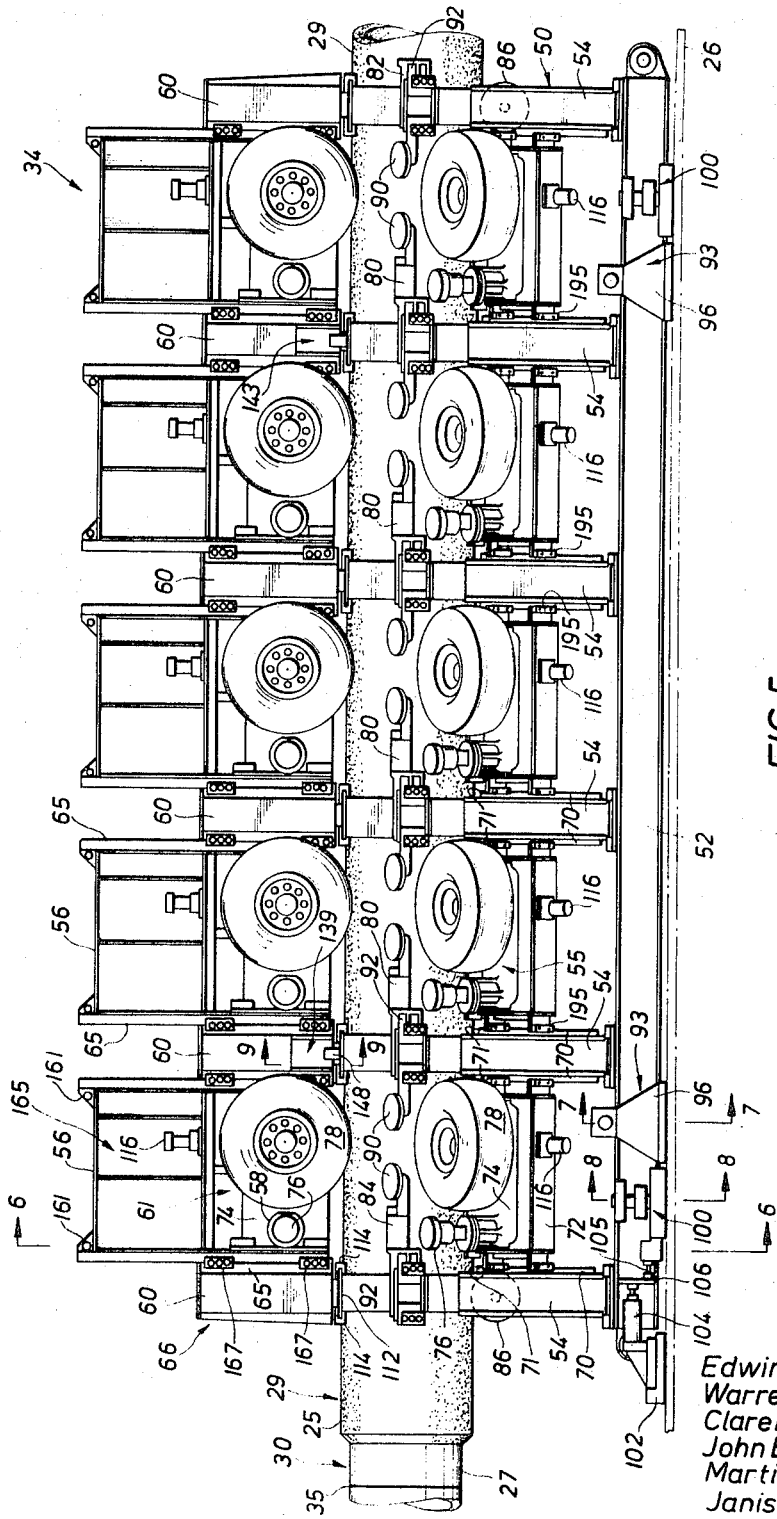

Edwin J. Dressel, Warren A. Petrie
Clarence W. Shaw, John E. Isakson
Martin L. Adams, Janis Grinbergs
INVENTORS BY Arnold, Roylance,
Kruger & Durkee
ATTORNEYS

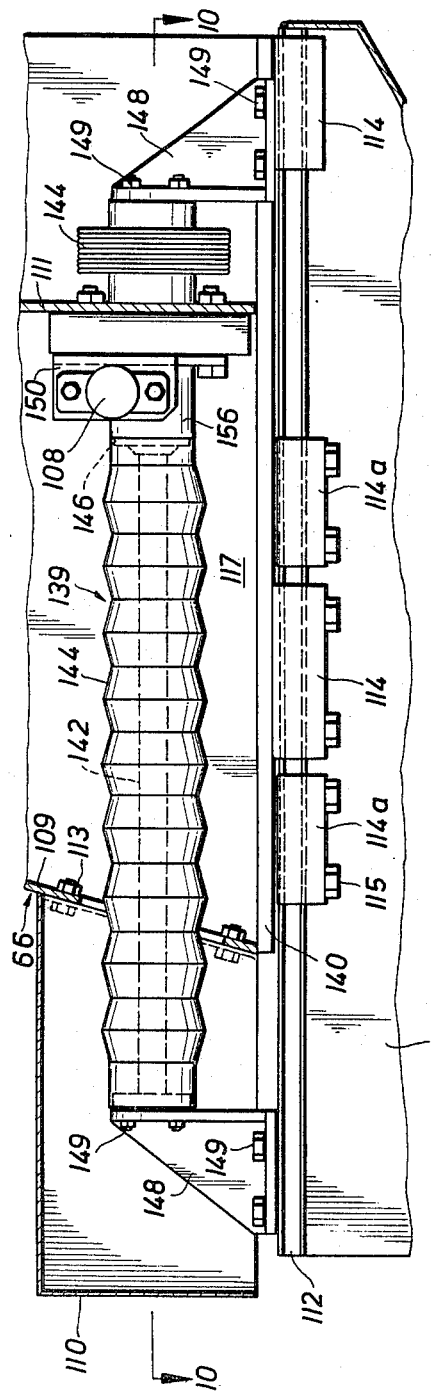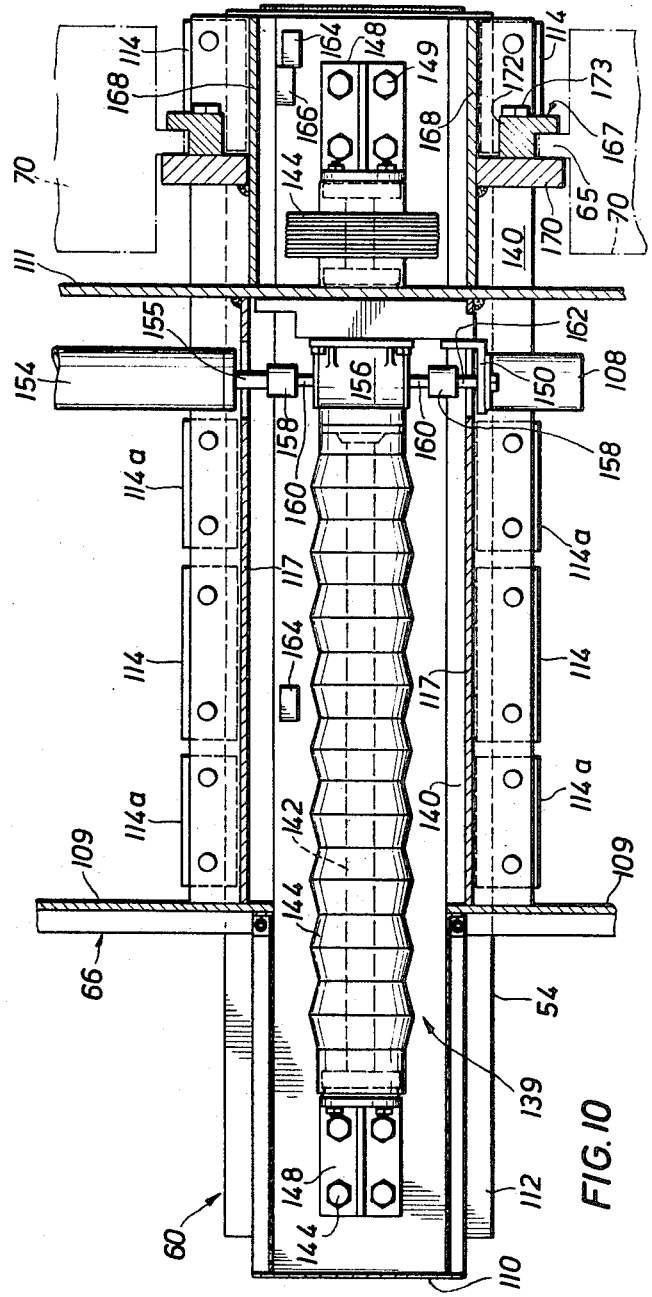
FIG.9
FIG.10
Edwin J. Dressel
Warren A. Petrie
Clarence W. Shaw
John E. Isakson
Martin L. Adams
Janis Grinbergs
INVENTORS
BY Arnold, Roylance,
Kruger & Durkee
ATTORNEYS

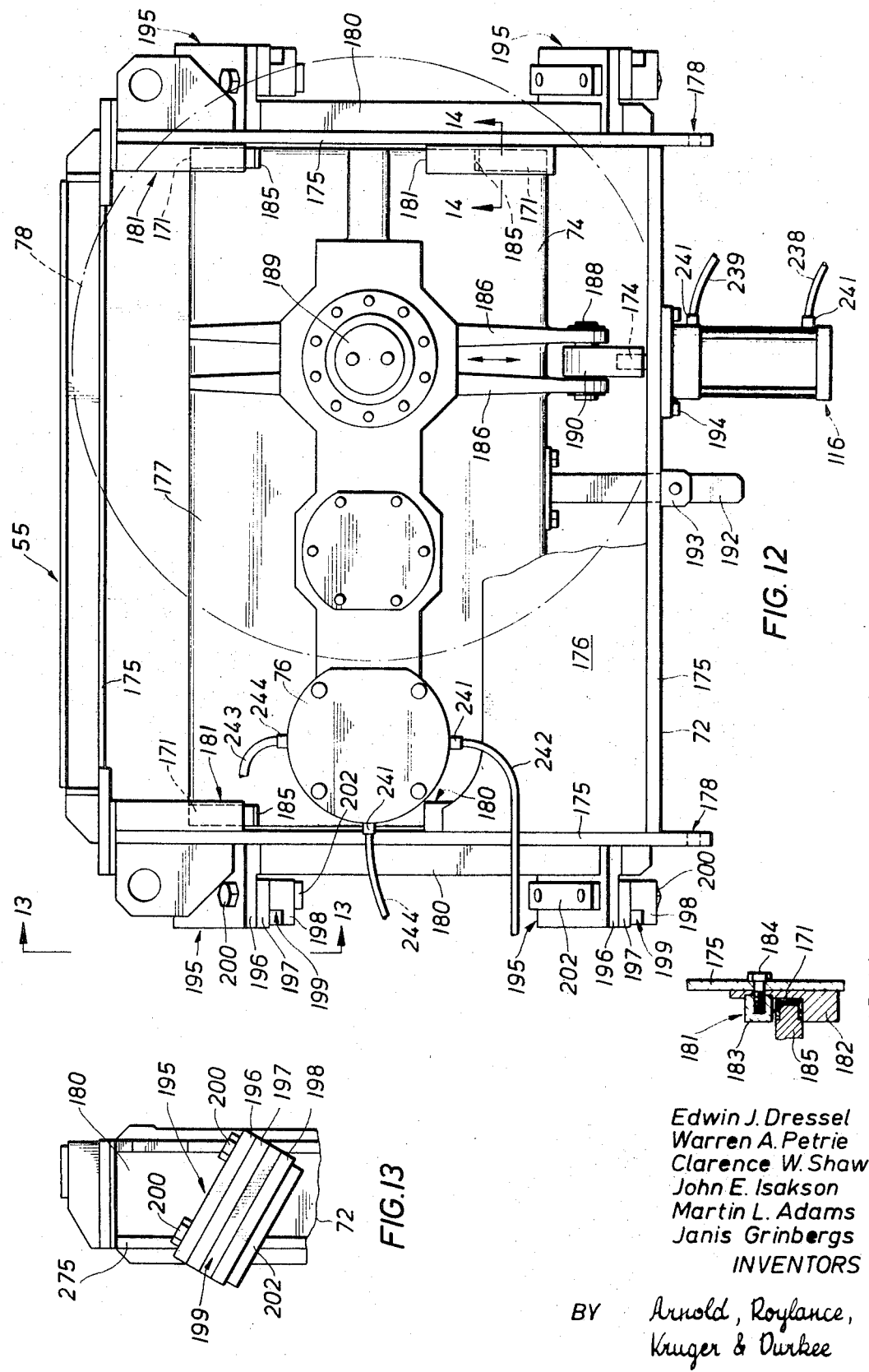

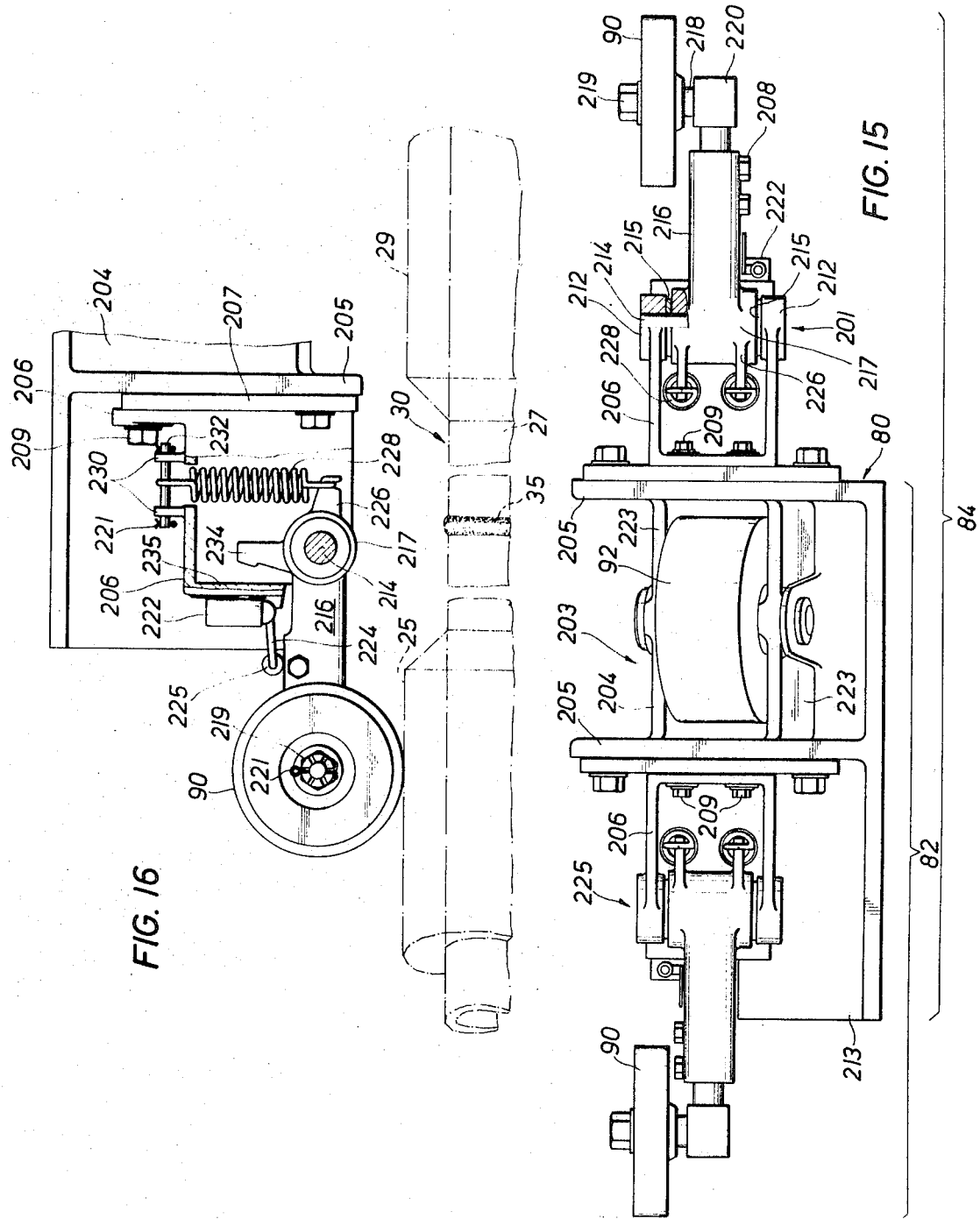

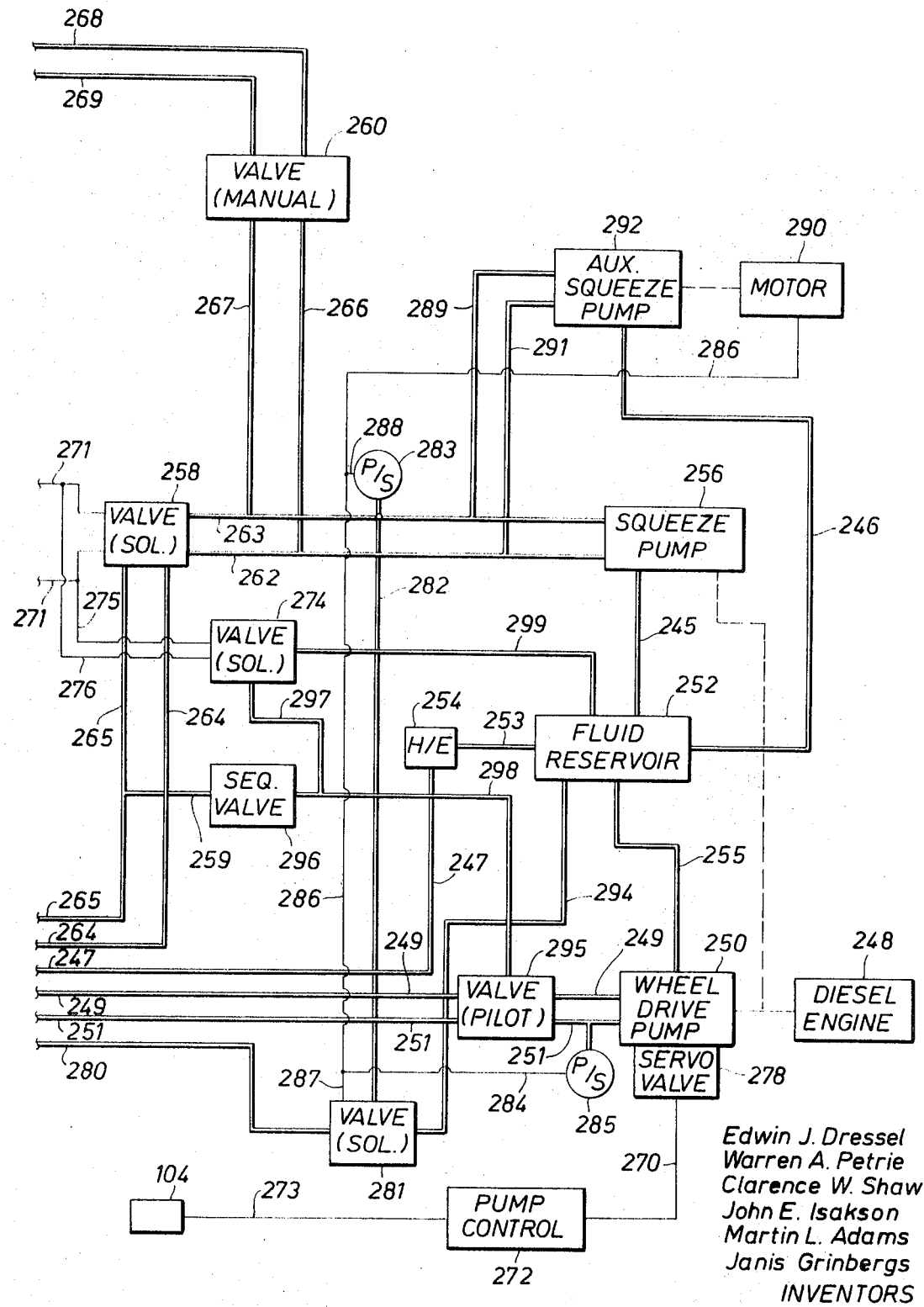

PIPE TENSIONING APPARATUS

This application is a continuation application of Ser. No. 823,107 filed May 8, 1969, now abandoned.

BACKGROUND OF THE INVENTION

The present invention relates to apparatus suitable for mounting on a floating movable barge or other vessel for tensioning a continuous pipe string during laying operations in deep water.

Metal pipe, which is to be positioned under water, for example on or under the ocean floor, is usually precoated with a waterproofing and weighting material in a fabrication yard in mill run lengths. These pipe sections are then joined together on the deck of a floating vessel or barge by butt welding into a continuous pipe string.

The welded ends of the pipe string are then field-coated with a corrosion resistant material and the completed pipe string is sequentially launched from the stern of the barge to the ocean floor as a continuous string of pipe. Such an operation is described in detail in U.S. Pat. No. 3,321,925, entitled "Deep Water Lay Barge and Method," issued to Clarence W. Shaw on May 30, 1967.

In launching the continuous pipe string from the floating vessel or barge, it must be allowed to bend convexly on the upper surface in its path to the bottom and again concavely on its upper surface as it approaches the ocean floor and a horizontal position. The pipe is thus subject to stress and movement from wave action, current and tides and as the depth and weight increase the strains and curvature sometimes become unmanagable and the pipe and/or the pipe coating is damaged or destroyed.

It has been found of primary importance to apply tension to the launched pipe string to prevent undue curvature in the suspended portion between the barge and ocean bottom and to limit curvature and flexure from other influences, such as wave action, current and tides, to safe limits. This tension may be applied by employing restraining means on the floating vessel or barge that engage the pipe string before launching and apply a predetermined resistance to the relative movement between the barge and the pipe. One such pipe restraining means is described in the aforementioned U.S. Pat. No. 3,321,925.

The various pipe tensioning devices presently employed are not satisfactory for various reasons. Some devices are not able to accommodate a wide range of pipe string diameters without major modification, thereby limiting their usefulness. Other devices have not proved successful because they are not capable of exerting the desired tension force on the pipe string to decrease the pipe curvature radii without damaging the external sealing and weighting coating applied to the metal pipe.

Additionally, presently employed pipe tensioning machines have not proved satisfactory in the launching of large diameter pipe strings into deep water because of their limited pipe tensioning capability in the face of the extremely large weight and compressive forces exerted on the pipe string.

Another common problem not solved by the presently utilized pipe tensioning devices is that there is no satisfactory means for maintaining a constant tensioning pressure on the pipe string when the floating barge is moved, due to wave action, longitudinally relative to the direction of payout of the pipe string.

Present machines apply normal pipe tensioning force to the pipe through a common beam transmitting the force to the drive wheels, necessitating complete release of tension to make repairs. This is dangerous and expensive if the repair is other than minor.

SUMMARY OF THE INVENTION

The instant invention provides a novel pipe tensioning apparatus for use in laying a submarine pipeline from a barge or similar vehicle to apply controlled tension to the pipe during the laying operation regardless of barge speed or motion resulting from wave action.

It is one feature of this invention to provide an improved pipe tensioning apparatus capable of gripping coated pipe of various sizes and exerting a large tensioning on such pipe without damage to the external coating.

It is among the other features of this invention to provide a pipe tensioning device which applies uniform squeeze pressure to the pipe from various points of frictional engagement around the pipe.

It is among the further features of this invention to provide a pipe tensioning apparatus utilizing gripping wheels wherein the total tension exerted on the pipe can be sensed from a point remote and independent of said wheels and the system driving said wheels.

It is a further feature of this invention to provide a tensioning device utilizing an electronic sensing system to regulate a hydraulic system to control tension.

It is among the further features of this invention to provide a pipe tensioning device capable of retaining substantial tension on a pipeline while some wheels of the apparatus may be disengaged from the pipeline for normal maintenance or repair.

These and other features of the instant invention will be apparent from the following specification, drawings and claims.

The pipe tensioning device of the instant invention comprises a frame having longitudinally disposed within the frame a plurality of traction wheel stations. At each traction wheel station a plurality, e.g., two or three, traction wheels are adapted to move radially inwardly and outwardly on a traction wheel assembly to form a longitudinal rack for the pipe and grip the pipe.

Each traction wheel assembly, desirably includes a pneumatic tire for engaging the pipe surface, and a hydraulic motor and reduction gear box for driving the wheel. The traction wheel assemblies at each traction wheel station can be hydraulically actuated into engagement with the pipe and are adapted to impart uniform squeeze pressure through each wheel. The traction wheel assemblies at each traction wheel station can also be independently hydraulically actuated to disengage the pipe to permit a hot field joint in the pipeline to pass through the machine without damage or to permit maintenance or repair at one station while the other wheels are maintaining tension. This engaging and disengaging action to avoid contact with the field joint is initiated automatically by limit switch assemblies which are triggered by the approach of a field joint to retract the wheels at one traction wheel station and again triggered by passage of the joint to reengage the pipe.

The pipe tensioner is mounted with respect to the barge so that the entire carriage of the machine performs the function of a pressure transducer. This carriage or frame is held suspended from pedestal supports on the barge deck. These components function to form a cradle arrangement at each support point allowing the pipe tensioner to be mounted independently with respect to the deck. This is done so that the entire pipe tensioner device can be preloaded against load cells or strain gauges mounted in stationary brackets on the deck. The load cells are then able to sense any change in the overboard pull of the pipe and provide feedback signals to the system electronics. The mounting arrangement permits some limited fore and aft movement of the carriage but prevents any athwartship motion thus enabling the strain gauges or load cells to sense the total tension in the pipelaying direction. Although this mounting is referred to herein as "suspension" of the frame above the deck it will be appreciated that any mounting technique which permits measurement of total force of the tensioner relative to the barge in the pipe laying direction can be used and is regarded as a suspended mounting as used herein.

An electronic system serves as the primary control for the system hydraulics. Once the operator sets the desired tension, for example on a control potentiometer, the pipe will pull until an equalizing signal from the two load cells balances the command signal. Thus there is provided a tension measuring system remote from the traction wheels themselves and from the hydraulic system which drives the wheels. Back-up hydraulic and manual systems are provided for sensing and controlling tension, however.

All the traction wheels are driven by bidirectional hydraulic motors which are in turn fed from hydraulic pumps which are driven by a suitable prime mover, e.g., a diesel engine. However, when because of sudden movement of the barge the pipeline is pushed or pulled through the apparatus, power is created which must be absorbed by the system. Hence to absorb such power, when necessary, the hydraulic motors of the device act as pumps driving the pumps as motors and operating the prime mover as a generator. Accordingly the power generated can be expended through the system when necessary without damage to the system.

Other aspects of this invention not outlined above will be apparent from the detailed description below.

BRIEF DESCRIPTION OF THE DRAWINGS

In order that the manner in which the above-recited advantages and features of the invention are attained, as well as others can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments.

In the drawings:

FIG. 2 is a schematic side view of a continuation of the pipe laying barge shown in FIG. 1 and showing the suspended portion of a string of pipe.

FIG. 3 is a fragmentary perspective view of a typical universal joint for attaching pipe flotation apparatus to the pipe laying barge shown in FIG. 1.

FIG. 4 is a vertical cross-sectional view of a typical pipe flotation apparatus supporting the pipe string.

FIG. 5 is a side elevational view of the pipe tensioning apparatus according to the present invention.

FIG. 9 is a partial vertical cross-sectional view of a portion of the pipe tensioning apparatus taken along lines 9—9 of FIG. 5.

FIG. 10 is a horizontal cross-sectional view of a portion of the pipe tensioning apparatus taken along lines 10—10 of FIG. 9.

FIG. 12 is a top plan view of a lower cage assembly.

FIG. 13 is a fragmentary side view of the lower cage assembly view along lines 13—13 of FIG. 12.

FIG. 14 is a vertical cross-sectional view of a portion of the lower cage assembly taken along lines 14—14 of FIG. 12.

FIG. 15 is a side view of a limit switch assembly.

FIG. 16 is a fragmentary detail view, partly in cross-section, of a portion of the limit switch assembly shown in FIG. 15.

FIG. 17B is a partial hydraulic and electrical shcematic diagram of the pipe tensioning apparatus including the hydraulic and electrical control systems.

DETAILED DESCRIPTION OF THE PREFERRED EMBODIMENTS

Figure 1:
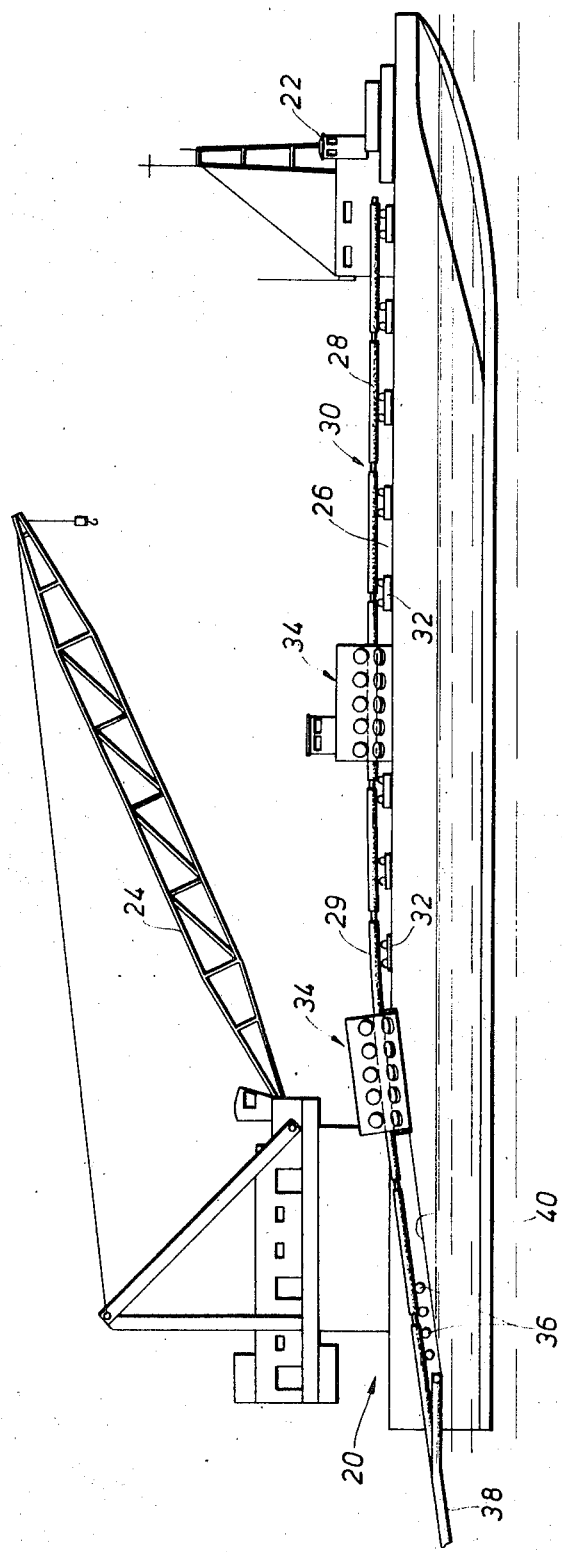
FIG. 1 is a schematic side view of a pipe laying barge utilizing the pipe tensioning apparatus according to the present invention.

Referring now to FIGS. 1 through 4, there is shown a buoyant vehicle referred to as a barge 20 having a suitable control structure 22 comprising navigation enclosures, crew quarters, etc., and a crane or hoist 24. Along the starboard side of the barge deck 26 are positioned at spaced intervals supporting V-roller assemblies 32 for supporting pipe sections 28 moved into position by a track mounted gantry or crawler crane(not shown). The pipe sections are welded together at field joints 30 for forming a continuous pipe string 29. Pipe string 29 passes through pipe tensioning machines 34 which engage the outer surface of pipe string 29 and provide a predetermined tension to the pipe string 29. As the pipe string 29 is discharged from the rearmost pipe tensioning machine 34, it continues rearwardly and downwardly over a ramp 40 and support rollers 36 into a flotation structure or stinger 38 that is attached to ramp 40 and extends rearwardly of barge 20 into the water for supporting the continuous pipe string 29 as it is discharged into the water.

In FIG. 1 two pipe tensioning machines are shown positioned along the starboard side of the barge deck, however, depending on the maximum pipe tension desired, only one machine or any combination of two or more machines may be utilized. These machines may be positioned, along with appropriate V-roller assemblies 32, along the port side or down the centerline of the vessel as well.

As may be seen in more detail in FIG. 2, pipe string 29 passes down the rearwardly slanting ramp 40 of barge 20 over support rollers 36 and onto an articulated or continuous type flotation structure, commonly known as a "stinger" 38 that at least partially supports the weight of the suspended section of the pipe string 29 and helps reduce the bending moment on the pipe. When laying pipe lines of the diameter generally encountered, typically a 30-inch O.D. pipe having a one-half inch wall thickness and an outside waterproof and weighting coating of 3–4 inches applied, the pipe in seawater will have a negative buoyancy. Thus, it can be seen that when laying such pipe in deep water, the weight-inwater of the suspended pipe string 29 develops high values of vertical loads. It is to reduce this vertical load on pipe string 29 that the stinger 38 is provided. This not only enables the pipe to be tensioned with less forward thrust on the barge but also insures that the tension applied by the pipe tensioning apparatus 34 will maintain the curved portions of the pipes 31 and 33 at such a long radius of curvature that undue bending stresses are not set up in the pipe string 29.

The stringer 38 is typically attached to barge 20 as shown in greater detail in FIG. 3. Tubular float members 44 are held in a spaced parallel relationship by transverse supporting members 46. Tubular members 44 terminate in conically tapering ends 39 insertable, respectively, in housings 42 that are fixed to the ramp 40. Each conically tapered end has spaced half-cylindrical channels 41 for accomodating locking pins 43 and securing the tubular members 44 to the barge ramp 40.

The construction of stringer 38 is shown in greater detail in FIG. 4, the tubular flotation members 44 spaced in a parallel relationship and joined by transverse supporting members 46. Transverse inclined support rollers 48 are mounted on each of the transverse supporting members 46 so that such rollers 48 on alternate cross members 46 are oppositely and axially aligned for cradling and supporting pipe string 29.

Figure 6:
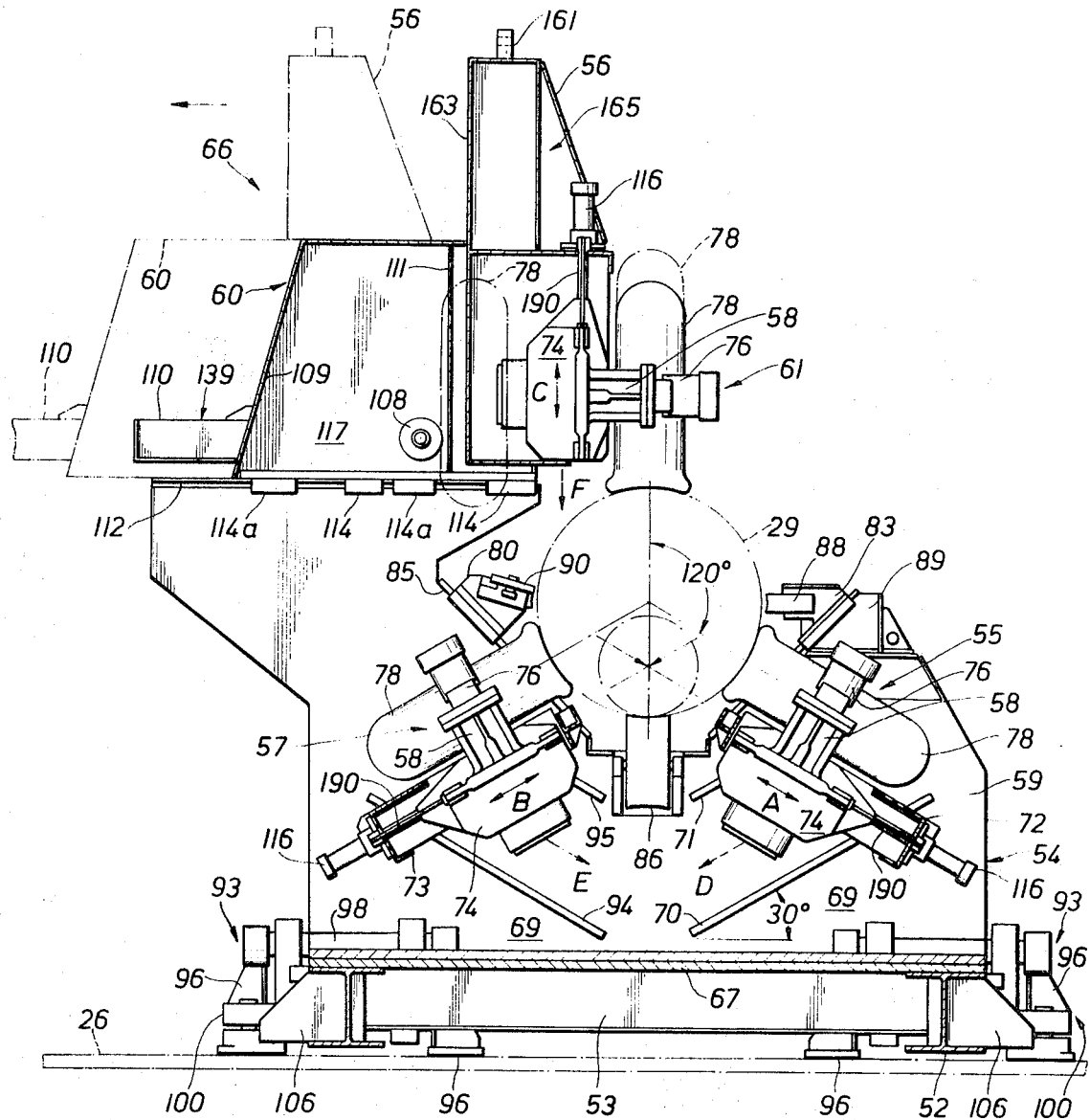
FIG. 6 is a vertical cross-sectional view of the pipe tensioning apparatus taken along lines 6—6 of FIG. 5.
Figure 7:
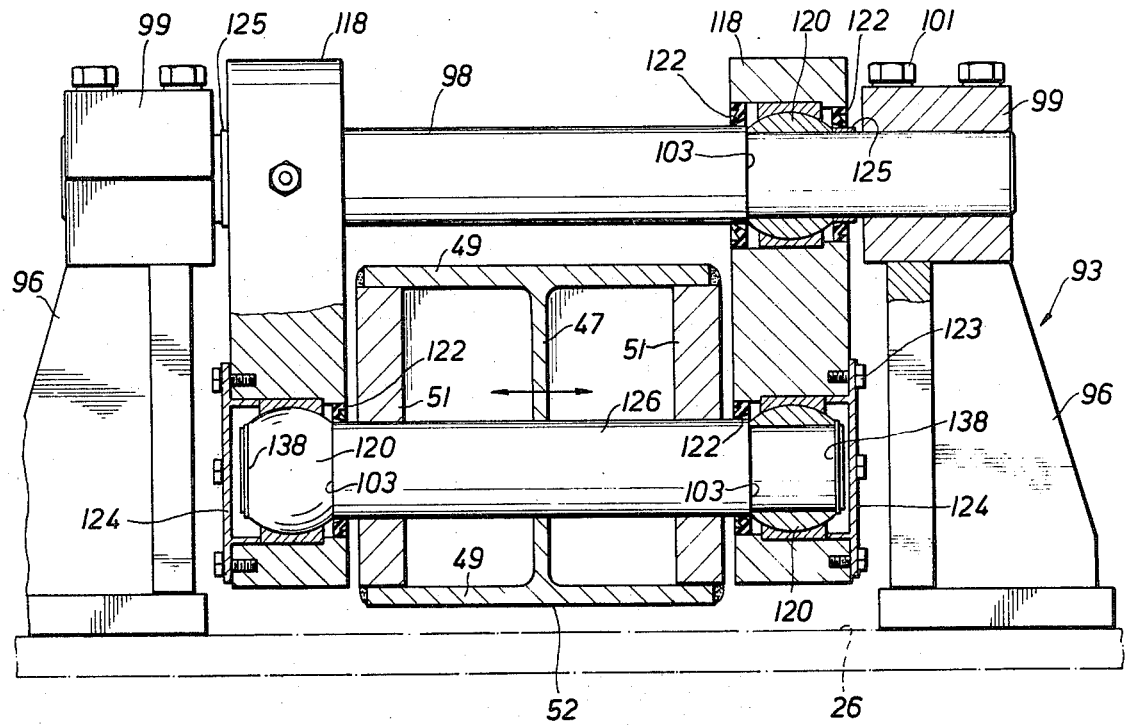
FIG. 7 is an enlarged detail view, partly in cross-section, of a portion of the pipe tensioning apparatus taken along lines 7—7 of FIG. 5.
Figure 8:
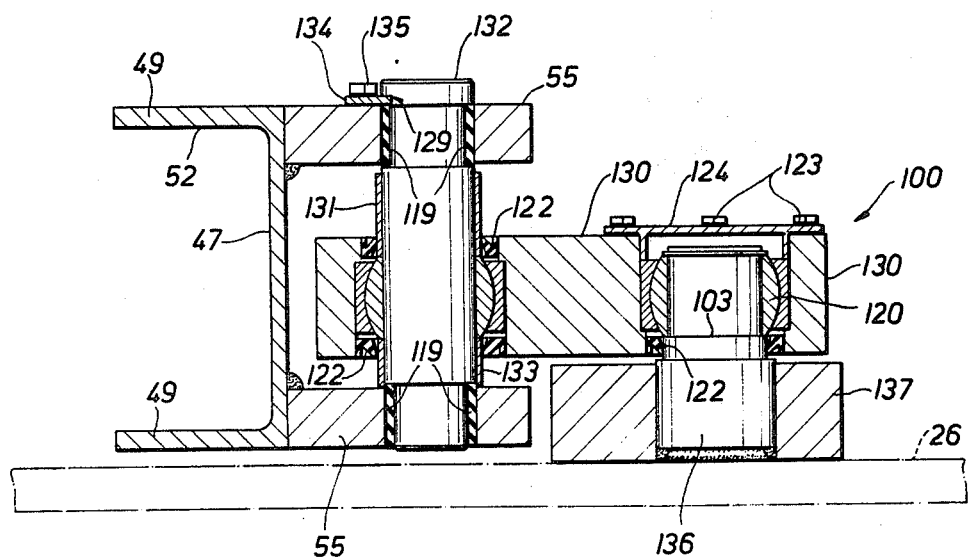
FIG. 8 is an enlarged detail view, partly in cross-section, of a portion of the pipe tensioning apparatus taken along lines 8—8 of FIG. 5.
Figure 11:
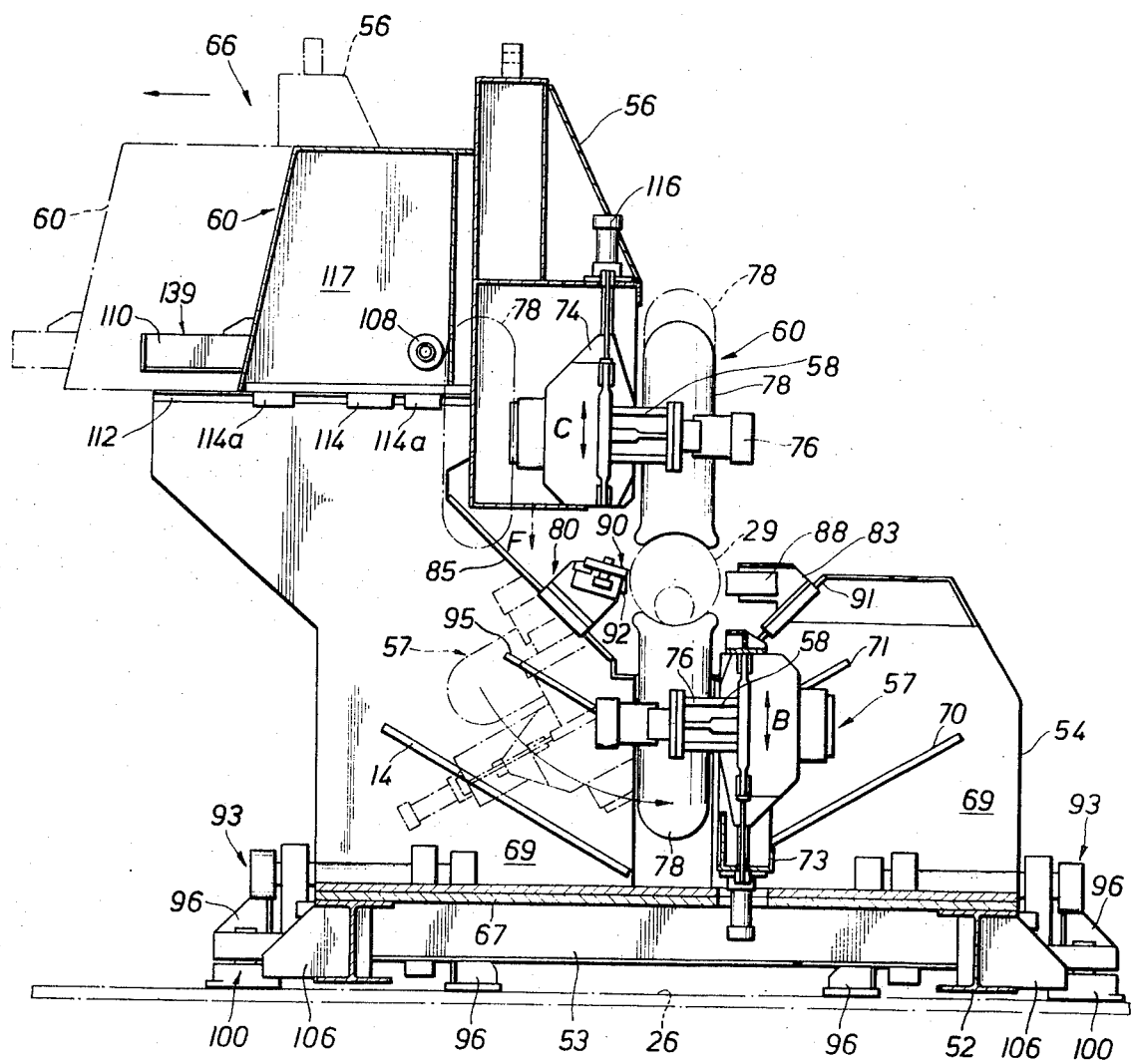
FIG. 11 is a vertical cross-sectional view of a modified version of a pipe tensioning apparatus according to the present invention shown in FIG. 6.
Figure 17A:
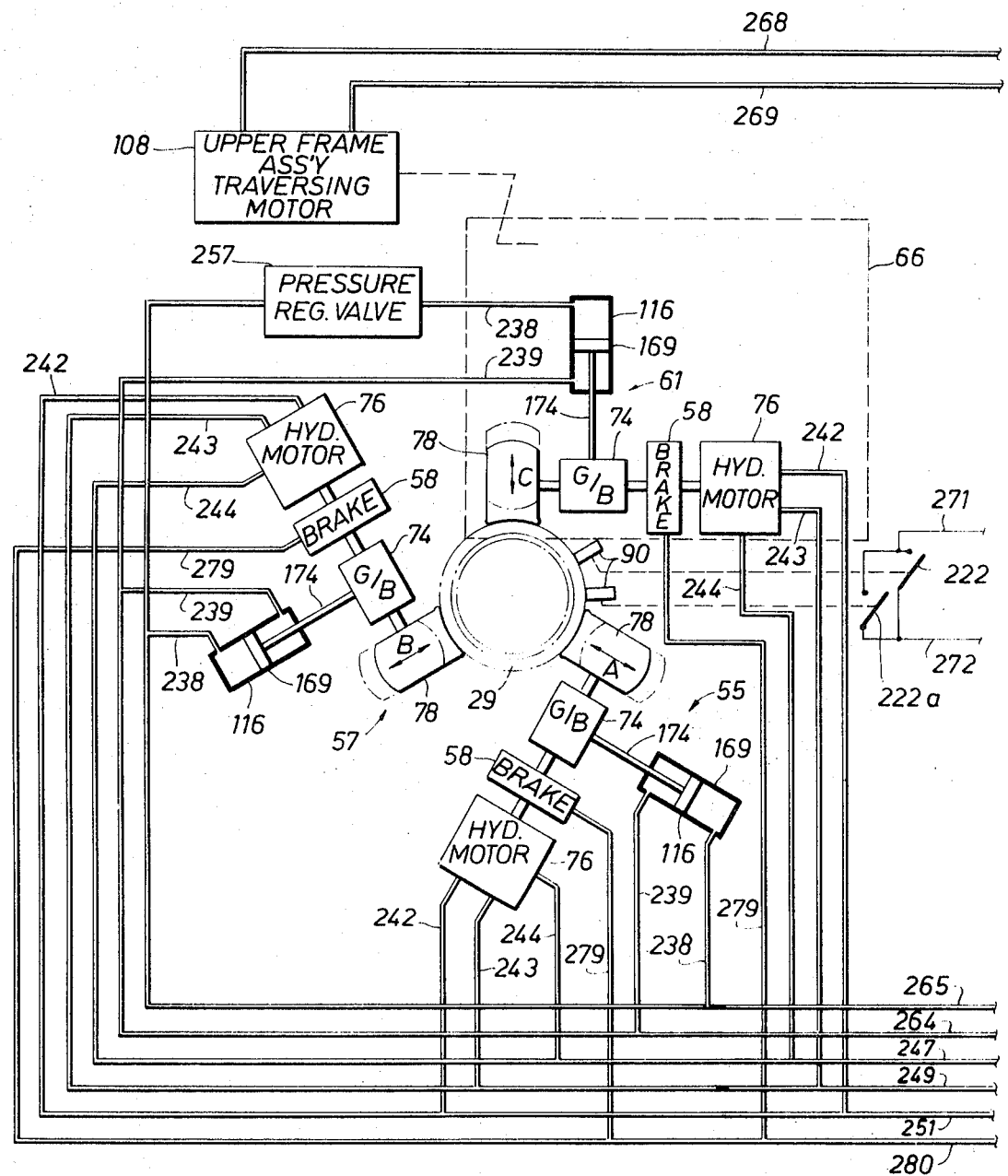
FIG. 17A is a partial hydraulic schematic diagram of the pipe tensioning apparatus according to the present invention showing the hydraulic distribution to the hydraulic motors and squeeze pistons.

Referring now more particularly to FIGS. 5, 6 and 11, there is shown therein a more detailed illustration of the pipe tensioning apparatus 34, previously referred to. The pipe tensioning apparatus 34 comprises a lower frame assembly 50 and an upper frame assembly 66 adapted for transverse lateral movement with respect to the lower frame assembly. Lower frame assembly 50 is an elongated frame structure having a rectangular base comprised of longitudinal side rails 52 and transverse end members 53 joined together to form a rectangular I-beam rail structure having disposed thereon six upright supporting frames 54. As may readily be seen in FIG. 6, the pair of upright support assemblies are mounted transversely between the longitudinal side rails 52 and have a configuration that provides a generally V-shaped opening for axially accommodating the pipe string 29. The six upright supporting members provide five compartments for the mounting of the drive wheel apparatus that will be hereinafter further described.

The upright supporting frames 54 and 56 comprise an integral metal frame having affixed thereto metal side plates 69. The assemblies are base mounted on a supporting plate 67 that is attached transversely between rails 52. Attachment of the upright supporting frame and the transverse support plate to the base rails may be accomplished in any suitable manner, preferably by welding in order to eliminate vibration and adding to the structural rigidity of the frame assembly 50.

Disposed on the outer surfaces of plate 69 of each upright support member 54 are two pairs of metal bars forming outwardly projecting flanges 70, 71, 94 and 95. Flanges 70 and 71 are disposed forwardly on side plate 69 in a parallel spaced relationship slanting downwardly toward the longitudinal centerline of the frame assembly 50 at a 30° angle to the horizontal. Similarly, flanges 94 and 95 are disposed rearwardly on side plate 69 adjacent flanges 70 and 71 in a parallel spaced relationship and slanting downwardly toward the longitudinal centerline of the frame assembly 50 at a 30° angle to the horizontal. The function of the angularly disposed flanges 70, 71, 94 and 95 will be hereinafter described in greater detail.

The upper horizontal edge of the rear portion of the supporting members 54 has disposed thereon a rail member 112 lying parallel to transverse rail member 53. The function of rail 112 is to support the upper frame assembly 66 and to allow it to move transversely with respect to the lower frame assembly 50 as will be hereinafter described in greater detail.

The upper frame assembly 66 comprises six upright frames 60 symmetrically spaced for alignment with the corresponding upright support assemblies 54. The frames are joined longitudinally by means of plates 109 and 111 to make the upper frames assembly 66 an integral unit having five equidistant compartments aligned with and spaced above the corresponding five compartments formed in the lower frame assembly between supporting members 54. Attached at the base of each of the upright frames 60 are spaced rail guides 114 for engaging the edges of rails 112 for enabling the upper frame assembly 66 to move laterally with respect to the lower frame assembly 50. Locking clamps 114a provide a means for locking the upper and lower frame assemblies together as a unit during pipe tensioning operation.

Disposed within each of the five compartments defined by the upper and lower frame assemblies 50 and 66, respectively, are three traction drive wheel assemblies 55, 57 and 61 for engaging pipe string 29 and providing the required tension. Since each of the defined compartments contains the identical traction assemblies 55, 57 and 61, the description of the traction assemblies disposed in one compartment defined by adjacent upper and lower upright frames 54 and 60 will apply equally to the remaining four compartments.

Adjacent the forward upright edge of frames 60 and fixed on either side of the frames are vertically spaced clamping assemblies 167 as may be more readily seen in FIG. 10. Drive wheel assembly 61 has a generally rectangular cage assembly 70 having disposed along its shorter sides extending flanges 65 that are insertable in the clamping members 167 for supporting the traction wheel assembly 61 between adjacent spaced pairs of upright assemblies 60 (See FIGS. 5 and 10).

Disposed as a unit within the cage assembly 70 is a hydraulic motor 76, a brake 58, and a reduction gear box 74 for driving a pneumatically tired wheel 78. The motor 76, brake 58, gear box 74 and wheel 78 unit is adapted for sliding arrangement within the cage assembly 70 to allow the entire drive unit to move vertically within the supported cage assembly 70 in the direction indicated by the arrow C for raising and lowering the wheel 78 into and out of traction engagement with the surface of pipe string 29. The sliding arrangement of the unit within the cage assembly 70 will hereinafter be further described in greater detail. A means for displacing the drive unit within cage assembly 70, preferably a hydraulic cylinder 116, is attached to the cage assembly 70 for vertically displacing the drive unit and hence traction wheel 78 as hereinbefore described. In the embodiment shown, the piston rod of hydraulic cylinder 116 is suitably attached to the housing of the reduction gear 74 by means of a connector 190 for providing a means of raising and lowering wheel 78 (See FIGS. 5, 11 and 12).

Disposed in the lower compartment defined by the upright frames 54 and 60 are traction wheel assemblies 55 and 57. The traction wheel assemblies 55 and 57 have forward and rear cage assemblies 72 and 73, respectively, supporting drive units identical to that above discussed. Assembly 72 contains a drive unit consisting of a hydraulic motor 76, a brake 58 and a reduction gear box 74 for driving a pneumatically tired wheel 78. The drive unit components are identical to those of the drive unit hereinbefore described for use with the upper cage assembly 70. The drive unit is adapted for sliding movement within the cage assembly 72 similar to the arrangement utilized in cage assembly 70 as will be hereinafter further described.

As previously described in connection with the upper cage assembly 70, a means for displacing the drive unit within cage assembly 72, preferably a hydraulic cylinder 116, is attached to the cage assembly and connected to the drive unit by a coupling member 190. Cylinder 116 operates to displace the drive unit, in the direction shown by the arrows A, radially withdrawing the wheel 78 from engaging frictional contact with the outer surface of pipe string 29.

Cage assembly 72 is attached to the extending flange members 70 and 71 by means of clamp assemblies 195 that are integrally attached to the sides of cage assembly 72 (see FIGS. 5, 6, 11, 12 and 13). Similarly, the rear lower cage assembly 73 is attached to flanged members 94 and 95 of the upright supporting assemblies 54. A drive unit consisting of a drive motor 76, brake 58, reduction gear box 74 and drive wheel 78, as hereinbefore described for use with cage assemblies 70 and 72, is slidingly disposed within cage assembly 73 and adapted for limited lateral movement. A hydraulic cylinder 116, coupled to the drive unit by means of its piston shaft and coupling 190, provides the means for radially displacing the drive unit and wheel 78 as hereinbefore described.

The clamp assemblies are angularly disposed with respect to the sides of cage assemblies 72 and 73 so as to radially tilt wheels 78 at an angle of 120° from the vertical. In the three-drive wheel configuration of apparatus 34 shown in FIGS. 5 and 6, it may be seen that wheels 78 of the traction wheel assemblies 55, 57 and 61 radially engage the outer surface of pipe string 29 at 120° spaced intervals. Flange members 94 and 95 are disposed at a 30° angle to the horizontal for allowing cage assemblies 72 and 73 to be repositioned for accommodating varying diameters of pipe.

Pipe string 29 passes longitudinally through the generally V-shaped opening in adjacent ones of the upright frame members 54 and is supported along its lower axial length by means of a series of support rollers 86 centrally disposed in a slotted space in upright frames 54. A lateral guide roller 88 is disposed laterally adjacent pipe 29 and secured to frame member 54 by means of a bracket 83. An extension 89 is attached to the forward upper horizontal edge of each of the upright supporting frames 54 when the pipe tensioning apparatus 34 is utilized the three-wheel configuration shown in FIG. 6 (for handling large diameter pipe). As may be seen in FIG. 11, when pipe tensioning machine 34 is modified for using only two drive wheels (for handling small diameter pipe) fixture 89 is not needed and support roller 88 may be attached by means of bracket 83 directly to the flanged rim 91 of frame 54 for properly positioning the guide roller.

Limit switch assemblies 80 are attached to a flanged rim 85 for providing a second lateral guide roller 92 and limit switch rollers 90 that engage the outer surface of pipe string 29 for detecting the pipe section joints 30 shown in FIG. 5. End limit switch assemblies 82 and 84 are mounted at opposite ends of lower frame assembly 50 and provide a guide roller 92 and a single limit switch roller 90 for contact with the outer surface of pipe string 29. Guide rollers 88 and 92 do not continuously contact the outer surface of pipe 29, but provide guide means to limit lateral movement of the pipe 29.

Referring now to FIGS. 5, 6 and 11, the pipe tensioning apparatus 34 is shown movably suspended above the deck 26 of barge 20 by means of suspension assemblies 93, positioned adjacent each of the ends of the longitudinal side rails 52. Stabilizer assemblies 100 limit the longitudinal and transverse movement of pipe tensioning apparatus 34 in its suspended position. A load cell 104, which may conveniently be a conventional electronic bridge-type strain gage, is attached to deck 26 by means of a bracket 102 and positioned to contact a load cell plate 106 fixed to and extending laterally from side rails 52 adjacent the end thereof in the direction of pipe string 29 payout. The load cell or strain gage 104 measures the tension being exerted on pipe string 29 by the pipe tensioning apparatus 34 for controlling the operation of the traction drive assemblies 55, 57 and 61 as will be hereinafter more fully described.

Referring now to FIGS. 1, 5, 6 and 11, the pipe tensioning machine 34 is shown with pipe string 29 passing therethrough. The machine 34 is movably suspended above the barge deck 26 as hereinbefore described, and has five identical sets of three 120°-spaced traction units for handling conventional size pipe strings 29. Of course, as previously described, the apparatus 34 may be modified to a two-wheel assembly having 180°-spaced traction units for handling small diameter pipe strings. Each of the traction wheel assemblies 55, 57 and 61 consists of a pneumatic tired wheel 78 driven by a hydraulic motor 76 through a reduction gear box 74. Each traction wheel assembly 55, 57 and 61 is separately hydraulically valved and driven in such a way that the three wheels 78 are simultaneously retracted from the outer surface of pipe string 29 as the field joint area 30 approaches the radially spaced traction wheels 78. The retraction of the wheels 78 prevents the wheel traction pressures from being exerted on and at the weld 35 and at the end 39 of the waterproofing and weighting coating 25 applied to the metal pipe 27 (see FIG. 5). The field joint 39 is sensed by the limit switch assemblies 80, 82 and 84 as the limit switch rollers 90 axially traverse the outer surface of pipe string 29 and enter the field joint area 30. As soon as the field joint 30 passes the three radially spaced traction wheels 78, the wheels are driven into frictional engagement with the outer surface of pipe string 29 to re-establish the traction wheel forces. A radial set of three wheels (or a set of two wheels in a two-wheel configuration) may be retracted during maintenance or repair while the remaining sets of drive wheels continue in contact with the pipe 29.

Pipe string 29 will be drawn through the pipe tensioning apparatus 34 in the direction shown by the arrow in FIG. 5 for discharge over the rear ramp 40 of barge 20 into the water. Under these conditions, traction driving wheels 78 of the traction wheel assemblies 55, 57 and 61 are being driven counterclockwise to resist the rearward movement of pipe string 29 and apply tension pressure to the pipe string for the purposes hereinbefore described. On the other hand, barge 20 may under certain circumstances be urged rearwardly in a direction opposite to the payout direction of pipe string 29 by wave action coupled with the pitch, roll, heave and yaw of the barge, thereby attempting to reduce the tension exerted on pipe string 29 and place the pipe string in compression. This is most commonly experienced when the barge is stopped in the water.

In order to maintain the pipe tensioning pressure at a predetermined value, the load cell 104 senses any abrupt increase or decrease in the forces exerted on machine 34 and instantaneously causes the hydraulically operated traction wheel assemblies 55, 57 and 61 to increase the traction driving forces exerted by wheels 78 in order to maintain the pipe string tension at a desired value.

As hereinbefore mentioned, the upper frame assembly 66 may be moved transversely on rail member 112 for laterally displacing the traction drive wheel assemblies 61 and allowing clearance so that the pipe string 29 may be removed upwardly and laterally from the machine by a suitable davit or crane arrangement (not shown).

The pipe tensioning apparatus 34 utilizes the three-wheel drive configuration shown in FIGS. 5 and 6 when large diameter pipe strings 29 are handled. Due to means of adjustment available for repositioning drive wheel assemblies 55, 57 and 61 along extensions 70, 71, 94, 95 and 65, clamp assemblies 195 and 167, the position of the three drive wheels may be changed to accommodate pipe strings 29 of differing diameters.

With pipe having an O.D. of which the circumference of the pipe is either equal to or less than the combined tread widths of the three drive wheels 78, interference is caused between the pneumatic tires with a loss of traction on the pipe. To overcome the tire interference problem the two-wheel configuration of the apparatus 34 may be employed as shown in FIG. 11.

In the two-wheel configuration, the traction wheel assembly 55 is removed and traction wheel assembly 57 is moved from its rear position between adjacent upright structural frames 54 forward and attached between adjacent brackets 70 and 71. Traction wheel 78 of assembly 57 is now oriented vertically below pipe string 29 and directly opposing wheel 78 of the upper assembly 61. Lateral guide rollers 88 and the switch assemblies 80, 82 and 84 are adjusted to accommodate the pipe of differing diameter as hereinbefore described. The tensioning apparatus 34, when modified to the two-wheel configuration shown in FIG. 11, may conveniently handle pipe strings having the smallest commercial pipe size in use for pipe laying.

Referring now to FIGS. 5, 6, 7, 8 and 11, pipe tensioning apparatus 34 is movably suspended above the barge deck 26 by means of suspension assemblies 93 positioned adjacent each of the four corners of the lower box frame defined by side rails 52 and transverse rails 53. Plates 51 are welded between the horizontally extending flanges 49 of the wide flange (W/F-beam) rail member 52. A supporting shaft 126 is disposed horizontally through plates 51 and the W/F-beam web 47. A self-aligning bearing 120 is disposed on each end of shaft 126 and retained thereon in contact with shoulder 103 of shaft 126 by means of a snap ring 138.

A pair of pedestal members 96 are positioned on opposite sides of side rail 52 and are conveniently fixed to the barge deck 26, preferably by welding so as to gain increased stability. A shaft 98 is disposed between the spaced pedestal members 96 and fixed at each end thereto by means of clamping journals 99 suitably attached to pedestal members 96 by any conventional means, such as bolts 101. Disposed on shaft 98 are a pair of movable depending arms attached by means of self-aligning bearings 120. Bearings 120 are retained in place by means of shaft shoulder 103 and a sleeve 125. The bearing compartment of arm 118 is sealed by conventional flexible seals 122.

The depending ends of supporting arms 118 straddle rail member 52 and are adapted to receive the self-aligning bearings 120 attached to the ends of support shaft 126. A bearing retainer plate 124 holds the bearing 120 in contact with the shoulder 103 of shaft 126, and is attached to arm 118 by any conventional means, such as bolts 123. The other side of arm 118 communicating with the compartment containing the self-aligning bearing 120 is sealed by means of a conventional seal 122. A lubricating fitting is provided on supporting arms 118 for providing a means of conveniently lubricating the bearings 120. As may be seen in FIGS. 5 and 7, the suspension assemblies 93 allow the pipe tensioning machine 34 limited longitudinal and transverse movement.

The transverse movement of the pipe tensioning apparatus 34 is controlled by means of stabilizer assemblies 100 mounted adjacent each of the suspension assemblies 93. Stabilizer extension bars are fixed to the web 47 of W/F-beam side rails 52 to form a pair of substantially horizontal parallel extensions 55 through which is vertically disposed a stabilizer shaft 132. Shaft 132 is maintained in place between extensions 55 by means of a keeper plate 134 which engages a radial slot 129 in the outer surface of the upper end of shaft 132. Keeper plate 134 is secured to the upper extension 55 by any suitable attaching means, such as a screw 135. Shaft 132 has rubber bushings 119 integrally moulded into radial grooves for providing a flexible bearing surface adjacent extending arms 55 and allowing very limited deflection of side rails 52.

A base 137 is fixed to the upper surface of barge deck 26 and has a fixed projecting vertical shaft 136. A self-aligning bearing 120 is axially disposed adjacent the upwardly protruding end of shaft 136 and is retained in place by means of a shoulder 103 in the shaft and a snap ring 138. An elongated arm 130 is adapted for rotational attachment to stabilizer shafts 132 and 136 by means of self-aligning bearings 120. The self-aligning bearing 120 mounted on shaft 132 is retained in position by means of supporting sleeves 131 and 133 and the circular opening in arm 130 to the bearing is sealed by means of conventional seals 122. A bearing retainer plate 124 seals the upper bearing closure of arm 130 over shaft 136. The lower opening in arm 130 communicating with the bearing 120 mounted on shaft 136 is sealed by means of a conventional seal 122. The stabilizer assemblies 100 allow extremely limited transverse movement of side rails 52 because the horizontal arcuate movement of the stabilizer arms 130 adjacent one side rail 52 will oppose the horizontal arcuate movement of arms 130 attached to the opposite side rail 52.

As hereinbefore mentioned, an extending plate 106 (see FIGS. 5 and 6) contacts the actuator of a load cell, a conventional electronic bridge-type strain gage, for sensing the forces exerted against the pipe tensioning apparatus 34 in the pipe payout directions. Loadcell 104, in contact with plate 106, is preloaded by means of loading bolt 105, and measures the force exerted by the machine frame in the longitudinal direction of pipe movement, either in the payout or haul-in directions. The load cell translates the measured pressure into electrical control signals as will hereinafter be described.

Referring now to FIGS. 5, 6, 9, 10 and 11, as hereinbefore described, the upper frame assembly 66 is movable transversely with respect to the lower frame assembly 50 by means of rail guides 114 engaging and sliding over the bearing surfaces of rails 112. A pair of warm gear jack assemblies 139 and 143, are mounted on the top surface of rail members 112 of the two outer upright support assemblies 54a and engage the upper frame assembly 66 to provide a means for driving the frame assembly transversely along rails 112. Power for driving the jack assemblies 139 is provided by means of a motor 108 that is coupled directly to assembly 139 and drives assembly 142 by means of a connecting shaft 154 (see FIG. 10). Of course, the motor for driving the screw jack may be any suitable driving means, such as an electric, hydraulic or pneumatic motor. In the embodiment illustrated in the drawings, it has been found advantageous to utilize a hydraulic motor.

The operation of the jack assembly 139 may be better understood by referring to FIGS. 9 and 10. The jack has a threaded shaft 142 mounted longitudinally on the upper surface of the rail member 112. The threaded shaft 142 is secured between two anchors 148 by means of end rings fixed to each end of the shaft and attached to the upright portions of the anchors. The end rings and the anchors may be mounted by any conventional means, such as bolts 149. Upper frame assembly 66 has a vertical longitudinal supporting wall 111 to which are attached perpendicularly extending spaced side plates 117 and 168 to form six pairs of aligned rectangular compartments, one opening rearwardly and one forwardly of wall 111. Each pair of compartments is disposed on longitudinal alignment with one of the rail members 112. Longitudinally attached to the bottom of each wall formed by plates 117 and 168 of the pair of compartments is an elongated rectangular plate 140 which projects outward over the longitudinal bearing surfaces of rail 112. Rail guides 114 are attached to the projecting edges of plates 140 and are adapted to slidingly engage rail 112. Rail clamps 114a are also attached to the projecting edges of plate 140 and are utilized to clamp upper frame assembly 66 to lower frame assembly 60 during the pipe laying operation.

Plates 109, 140 and 117 form a rectangular box-like compartment aligned with each supporting member 54. A machine screw jactuator 139 is disposed longitudinally within the compartment and fixed in place by means of anchor brackets 148. Anchors 148 may be suitably attached to the upper surface of plate 112 by any suitable attaching means such as welding, or by bolts 149 as shown in FIGS. 9 and 10. Jactuator 139 has a shaft 142 protected by a flexible "accordion" cover 144 mounted between the anchors 148 by any conventional securing means. A suitable opening is provided in wall 111 and rear plate 109 to accommodate jactuator 139. A drive motor 108 is conventionally mounted on a bracket 150 to drive the actuator mechanism 156 of the jactuator assembly. The covers 144 provide sealing protection for the screw threads of shaft 142 and protect the shaft from corrosive substances such as saltwater, and from the accumulation of foreign matter.

Motor 108 drives the actuator mechanism 156, suitably attached to wall 111 by any conventional securing means, by means of shafts 160 and 162, coupled by a sleeve coupling 158, causing the mechanism to engage the threaded surface of shaft 142 and to move longitudinally along shaft 142, depending on the direction of rotation of drive motor 108 as may be seen in FIGS. 6 and 11. The upper frame assembly 66 is moved transversely along rail 112 in response to the movement of the actuator mechanism 156. The jactuator assembly 143 is identical to screw-jack assembly 139, except that assembly 143 does not have a drive motor but is driven by means of shaft 154 attached by means of coupling 158 and shaft extension 155 to output shaft 160 of mechanism 156. Shaft 154 extends longitudinally through the interior of the upper frame assembly 66 and is coupled to the actuator mechanism 156 of jactuator 143 for driving the second assembly synchronously with assembly 139.

A metal block 66 is attached to the inward edge of one of the rectangular plates 140 for engaging a pair of spaced stop blocks 164 which are fixed to the top surface of the rail plate 112 for providing a means of stopping the forward and rearward movement of the upper frame assembly 66. A shield 110 is attached to the outside slanting surface of the rear plate 109 by any suitable attaching means, such as bolts 113, and is provided for covering the protruding end of the jactuator assembly 139.

Referring now to FIGS. 12—14, a traction wheel assembly 55 is shown in greater detail. Cage assembly 72 has a rectangular box frame 175 open on one side and partially enclosed on the other side by a plate 176. Rectangular bars 180 are attached to the two shorter sides of the cage frame 175 and provide a means for supporting and mounting clamp assemblies 195. Clamp assemblies 195 extend perpendicularly from the shorter sides of cage frame 175 and are disposed at a 30° angle with respect to the longer sides, as shown in FIG. 13, for cooperating and engaging flanges 70, 71, 94 and 95 of upright supporting members 54. The angular relationship of flanges 70, 71, 94 and 95 and clamp assemblies 195 cooperate to position wheel 78 at a 120° angle from the vertical (see FIG. 6) for engaging pipe string 29.

Clamp assemblies 195 comprise a fixed outwardly extending supporting bar 196 attached to the side of frame 175 and bar 180. Two movable members, a clamping plate 197 and an L-shaped clamping member 198, are attached to bar 196 by means of bolts 200 and a bolt retaining plate 202 to form an outwardly opening channel 199 for engaging the mounting flanges 70, 71, 94 and 95 (see FIGS. 5, 6 and 11). Clamp assemblies 195 may be loosened by means of bolts 200 and the position of the cage assembly 72 may be varied by moving clamp assemblies 195 longitudinally along flanges 70, 71, 94 and 95. Such repositioning may be necessary to accommodate various diameter pipe strings 29 as hereinbefore described.

The drive unit of traction wheel assembly 55 consists of a drive motor 76 coupled by means of a hydraulic brake 58 to a reduction gear box 74 disposed within cage assembly 72. As may be seen in FIGS. 6 and 11, brake 58 and attached motor 76 project upwardly from the gear box housing 177, which is adapted for lateral sliding movement within cage assembly 72. The housing 177 has transverse flanged surfaces 185 disposed at each of its four corners, the top and lower surfaces of the flanged edges 185 having bearing surfaces of shims 171 as well as a bearing shim attached to the outer surface of the flange 185 as shown in FIGS. 12 and 14. There are four support brackets 181 mounted within the interior of the cage assembly 72 for supporting the flanged ends 185 of housing 177 and permitting lateral sliding movement of the housing and attached brake and motor. The support brackets 181 comprise an L-shaped supporting bar 182 and a rectangular bar 183 attached to the cage frame 175 by means of a bolt 184 (see FIG. 14) to form an outwardly opening channel for accommodating the flanged edge 185 of housing 177.

Extending transversely from the upper surface of housing 177 are a pair of flanged ear-shaped members 186 that protrude laterally beyond the longitudinal side of housing 177 and are normal thereto. The center line between the spaced extending members 186 is aligned with the axial center of the drive wheel axle 189. Disposed transversely between the protruding ends of the extending members 186 is a shaft 188 having mounted thereon a coupling member 190. The coupling member 190 connects the gear box housing 177, through extending members 186 and shaft 188, to an extendable shaft 174 actuated by an extending and retracting means 116 for laterally moving the drive unit of the traction wheel assembly 55 within cage assembly 72. Means 116 may be any conventional means for providing reciprocating movement to shaft 174, such as a power operated screw-jack, a hydraulic cylinder, or a pneumatic cylinder.

It has been found advantageous in the preferred embodiment to utilize a hydraulic cylinder for means 116. Cylinder 116 may be attached to the frame 175 by any conventional mounting means, such as bolts 194. The cylinder piston rod 174 is actuated by hydraulic fluid pressure acting on the cylinder piston (not shown) to extend or retract rod 174 for laterally moving housing 177, with attached brake 58 and motor 76 and the traction drive wheel 78, within the cage assembly 72. As hereinbefore discussed, wheel 78 is retracted from frictional engaging contact with pipe string 29 when the pipe field joint 30 approaches the drive wheels (see FIGS. 5, 6 and 11). After the joint 30 has passed the drive wheel the cylinder 116 extends rod 174 to cause wheel 78 to again engage pipe string 29.

Cylinder 116 is shown having two hydraulic input lines 238 and 239 communicating with the interior cylinder by means of couplings 241. Hydraulic fluid pressure applied through tubing 238 extends rod 174, and fluid pressure applied through tubing 239 retracts or withdraws rod 174. A guide rod 192 is attached to the longitudinal side of housing 177 spaced from and adjacent to the extending members 186 and protrudes through an opening in the longitudinal side of cage assembly 72 and a sleeve 193 and functions to maintain the housing 177 in proper alignment within cage assembly 72 during its lateral movement.

Drive motor 76 as described herein, is a hydraulic motor for applying instantaneous changes in driving force to wheel 78 in either direction. Of course, other suitable motors may be employed without departing from the scope of this invention. The pressurized fluid for driving motor 76 is communicated to the motor through hydraulic lines 242 and 243, and couplings 241. Line 244, coupled to motor 76 through coupling 241, is the motor case drawn for completing the flow path of the hydraulic fluid.

The construction of traction drive wheel assembly 57 is identical to that of traction drive wheel assembly 55, with the exception that the drive unit comprising gear box 74, brake 58, motor 76 and drive wheel 78, is reversed within the rear cage assembly 73 for providing the proper orientation of wheel 78 with respect to pipe string 29.

The upper traction drive wheel assembly 61 utilizes the same drive units that are used in assemblies 55 and 57. However, as may be seen by referring to FIGS. 5, 6, 10 and 11, the upper cage assembly 70 has a different construction from that of assemblies 72 and 73. Cage assembly 70 has a box frame 163 constructed of suitable material, such as steel plates with an outwardly opening lower compartment for accepting the drive unit consisting of drive motor 76, brake 58 and gear box 74. Gear box housing 177 (see FIG. 12) is mounted within frame 163 and adapted for vertical sliding movement by utilizing the identical flange 185 and support bracket 181 arrangement as utilized in traction wheel assemblies 55 and 57 (see FIGS. 12 and 14). Cylinder 116 is mounted within an upper outwardly facing compartment 165 for moving the drive unit, including drive wheel 78, vertically to engage and disengage wheel 78 from the surface of pipe string 29 for purposes hereinbefore discussed.

Cage assembly 70 has longitudinal extending flanges 65 disposed on the opposite closed sides of cage frame 163 for engaging clamping assemblies 167 attached to wall 168 of upper frame assembly 66 (see FIGS. 5, 6 and 10). The clamping assemblies 167 comprise a bar 170 fixed to the outer surface of wall 168 and projecting perpendicularly therefrom. A block 172, having an L-shaped cross-section, is removably attached to bar 170 by means of bolts 173 to form a channel between block 172 and bar 170 for accommodating and gripping flange 65 of cage assembly 70. It may be readily seen that traction wheel assembly 61 may be repositioned vertically by means of flanges 65 and clamping assemblies 167 to adjust its traction wheel 78 for accommodating pipe strings 29 having different diameters. The operation of the drive unit of assembly 61 is identical to the operation hereinabove described for assemblies 55 and 57.

The limit switch assemblies 80, 82 and 84 are shown in greater detail in FIGS. 15 and 16. Limit switch assembly 80 comprises a guide roller assembly 203 and two limit switch assemblies 201 and 225. Guide roller assembly 203 has a roller bracket 204 with vertically extending end plates 205, and a flanged base 213. Bracket 204 has two parallel sides 223 disposed angularly between flanges ends 205 for accommodating a guide roller 92. Roller 92 is suitably mounted for rotational movement between sides 223. The limit switch assemblies 201 and 225 are attached to the outer surfaces of flanged ends 205. The limit switch frame 206 of each assembly 201 and 225 is attached to flanged end 205 by any conventional attaching means, such as bolts 209.

Bracket 206 has two parallel extensions terminating in hub members 212. An arm 216 is mounted for limited rotational movement with respect to frame 206 by means of a shaft 214 disposed transversely through a sleeve-shaped portion 217 of arm 216 and the spaced apart hubs 212. Thrust washers 215 are disposed between the inner surfaces of hubs 212 and sleeve portion 217 of arm 216. A striker arm 234 projects radially from the circular portion 217, within the rectangular box-shaped portion of frame 206, and limits the rotational movement of arm 216 by engaging the inner surface of wall 235. Longitudinally projecting from the enlarged circular portion 217 of arm 216 are a pair of spaced slotted fingers 226 for engaging one end of tension springs 228 and rotationally biasing arm 216. The other end of tension spring 228 is attached to a pin 232 supported between two upright ears 230, the pin being secured in place by any suitable retaining means, such as a cotter pin 221.

Attached to the outer surface of frame wall 235 and disposed adjacent arm 216 is a limit switch 222 having an extending actuator arm 224. Actuator arm 224 has a small roller 225 that engages one side of arm 216 (the side away from the spring-biased direction of movement) for sensing rotational movement of arm 216. A roller 90 is mounted for free rotation about a roller shaft 218 by means of a nut 219 and cotter pin 221. Shaft 218 is attached to the end of an arm 220 which is adjustably inserted into the end of arm 216. The extending length of arm 220 may be adjusted by means of screws 208.

The switch assembly 225, attached to the outer surface of the other end plate 205, is identical in construction to switch assembly 201 hereinabove described and will not be further described. The end limit switch assembly 82 comprises the guide roller assembly 203 and switch assembly 225, while end limit switch assembly 84 comprises roller assembly 203 and switch assembly 201, as shown in FIG. 15.

Referring now to FIGS. 5, 6, 11, 15 and 16, the flange 213 of guide roller bracket 204 is suitably attached to the flanged surface 85 of upright assemblies 54 by means of a conventional bracket or clamp (not shown). Flange 213 is disposed angularly with respect to the flanged ends 205 in order that when mounted, guide roller 92 is spaced radially adjacent pipe string 29 in a substantially horizontal attitude for providing a lateral guiding means for the pipe as the pipe string passes through apparatus 34. Switch assemblies 201 and 225 are adapted to project outwardly so that when guide roller 92 is properly positioned immediately adjacent the outer surface of pipe string 29, rollers 90 of switch assemblies 201 and 225 engage the outer surface of the pipe string 29. Arms 216 are rotated to a position thereby tensioning spring 228 and rotating striker 234 away from the inner surface of wall 235. With arm 216 in the above described position, limit switch 222 is actuated to its "off" position by the action of actuator arm 224.

As the pipe string 29 passes longitudinally through pipe tensioning machine 34, the field joint 30 of the pipe string 29 will pass through the pipe tensioning machine. As hereinbefore described, and referring to FIGS. 1 and 16, the pipe string is made up of a metal pipe section 26 butt welded to form a joint 35 and covered with a thick outer coating of a waterproofing and weighting material exposed at the field joint. Prior to launching the pipe string into the water, the exposed metal pipe 27 at the joint 30 is covered with a suitable patch of a waterproofing coating.

As the pipe string 29 moves through the pipe tensioning apparatus 34, rollers 90 engage outer surface of the pipe string. Rollers 90 will follow the outer surface of the waterproofing and weighting material 25 covering the pipe, and biased toward the pipe string 29, will ride into the field joint 30 as arm 216 rotates outwardly following the course of roller 90. The rotational movement of arm 216 actuates limit switch 222 when roller 90 enters field joint 30 to generate an electrical control signal for actuating cylinders 116 and radially retracting drive wheels 78 as the field joint 30 approaches the wheels.

SYSTEM OPERATION

Referring now to FIGS. 5, 6, 11, 12, 17A and 17B, the pipe string 29 is shown frictionally engaging wheels 78 of the 120° radially-spaced traction wheel assemblies 55, 57 and 61. Each of the drive wheels 78 is driven by a hydraulic motor 76 through a brake 58 and a reduction gear box 74. The drive unit consisting of motor 76, and brake 58 and gear box 74 is coupled to shaft 174 of double-acting hydraulic squeeze cylinder 116 for effecting radial displacement of the traction wheels 78 as hereinbefore described. The hydraulic motors 76 have a pair of hydraulic fluid input lines 242 and 243 that are connected via headers 251 and 249, respectively, and a pilot valve 294 to the output of a variable displacement hydraulic pump 250 capable of full rated pump delivery in either direction. A motor case drain line 244 is connected to each of the hydraulic motors for returning the hydraulic fluid passing through hydraulic motors 76 via header 247 to a heat exchanger 254. The heat exchanger 254 is connected via line 253 to a hydraulic fluid reservoir 252 that acts as a master-reservoir for the hydraulic motor system.

As may be seen from the system employed, the bidirectional motors 76 may act as pumps if the pipe is suddenly pushed or pulled through the machine. The pressure generated by the motors (turned pumps) 75 will in turn drive pump 250 as a motor and cause the prime mover 248 to act as a generator. Thus the horsepower regenerated in the hydraulic system during such sudden movement of the pipeline will be absorbed. As soon as movement in the proper direction resumes, the system returns to its primer mover-pump-motor function as hereinabove described.

The hydraulic fluid reservoir 252 is connected to the wheel drive hydraulic pump 250 via line 255 for providing a continuous flow of hydraulic fluid to the pump during operation. A diesel engine 248 or other suitable prime mover drives the hydraulic pump 250 and, through a power take-off device, drives a smaller capacity hydraulic pump 256 that operates the hydraulic squeeze cylinders 116. Pump 256 is connected to reservoir 252 via line 245. Squeeze pump 256 has an output line 262 and a return or drain line 263 connected to a solenoid actuated valve 258. The output of valve 258 is connected to each of the hydraulic cylinders 116 via headers 264 and 265, and lines 238 and 239. Line 238 applies the pressurized hydraulic fluid to one side of each cylinder piston 169 for driving the traction wheels 78 into frictional engagement with the outer surface of pipe string 29. When pressurized hydraulic fluid is applied via line 239 to the opposite side of each cylinder piston 169, the traction wheels 78 are radially displaced in the directions A, B and C, as shown by the arrows (see FIGS. 6, 11 and 17A) to a position indicated by the dotted lines, and away from frictional engagement with the outer surface of pipe string 29.

A pressure regulating valve 257 is inserted in hydraulic line 238 connected to squeeze cylinder 116 for regulating the hydraulic pressure of the upper squeeze cylinder. Since the weight of each upper traction drive wheel assembly is considerably, and is acting in a direction to reinforce the downwardly acting squeeze force, the regulating valve 257 provides a means of equalizing the total downward force being exerted by the upper drive wheels. In this way, the squeeze force exerted by the drive wheels 78 of the drive-wheel assemblies 55, 57 and 61 may be equalized.

The pair of rollers 90 of limit switch assemblies 80, 82 and 84 frictionally engage the outer surface of pipe string 29 (see FIG. 16) and are mechanically linked to switches 222 and 222a, wired in parallel. The switches are connected to solenoid valve 258 by means of wires 271 and 272.

Squeeze pump 256 is also connected via lines 262, 263, 266 and 267 to a manually operated valve 260. The output of valve 260 is applied to traversing motor 108 via lines 268 and 269. The hydraulic traversing motor 108 displaces the upper frame assembly 66 and the attached traction drive wheel assemblies 61 for purposes as hereinbefore described.

The preloaded load cell 104 (see FIG. 5 and 17B) in physical contact with the frame 50 of the pipe tensioning apparatus 34, senses the loading stress between the frame and the floating vessel or barge. This stress measurement is directly related to the pipe tensioning pressure being exerted by the drive wheels 78. The load cell 104 generates a signal when the axial pipe tensioning pressure varies above or below the preselected pipe tensioning pressure. The electrical signals generated by load cell 104 are conducted via connector 273 to the pump control unit 277, which controls hydraulic pump 250 by means of an electro-hydraulic servo valve 278 interconnected to the pump control by conductor 270. In response to commands from pump control 277, the servo valve 278 varies the displacement and direction of pump 250, thereby delivering hydraulic fluid to the wheel drive motors 76 in the required direction and of the desired force.

Brakes 58 are mechanical-hydraulic actuated multi-plate brake units interconnected between the drive shaft of motor 76 and the input shaft of gearbox 74. Hydraulic lines 279 connect each brake unit 58 to a brake header 280 which in turn is connected via a solenoid-actuated valve and line 282 to the output line 263 of squeeze pump 256. Line 294 interconnects brakes 58 via lines 279 and 280 and valve 281 to the fluid reservoir 252.

Pressure switches 283 and 285 are connected into line 263 of squeeze pump 256 and line 251 of wheel drive pump 250 respectively, and are actuated if the hydraulic pressure in lines 263 or 251 drops below a predetermined safe level. When actuated, pressure switch 285 completes electrical circuits via conductors 284 and 287 to solenoid valve 281 and via conductors 284 and 286 to a motor 290. Pressure switch 283 completes electrical circuits via conductors 288, 286 and 287 to solenoid valve 281 and via conductors 288 and 286 to motor 290.

Motor 290 drives an auxiallary hydraulic pump 292 that is interconnected via hydraulic lines 289 and 291 and check valve 293 to lines 263 and 262, respectively, of the main squeeze pump 256. Motor 290 may be any suitable motor whose source of power is independent of the main power source for the pipe tensioning machine 34. It has been found preferable to utilize an electrical motor for motor 290 because it has the advantage of being instantly responsive to pressure failure signals of switches 283 and 285, in addition to being readily adaptable to an independent source of power as above mentioned.

Sequence valve 296 is interconnected between the squeeze pressure header 264 and pilot-actuated valve 295 by means of hydraulic lines 259 and 298. When sequence valve 296 is actuated, hydraulic fluid is directed via lines 259 and 298 to actuate valve 295 for reasons to be hereinafter further described. Hydraulic line 298 and the fluid reservoir 252 are interconnected by line 297, solenoid-actuated valve 274 and line 299. Valve 274 is electrically connected in parallel with valve 258 via conductors 275 and 276, and is actuated simultaneously with valve 258 when rollers 90 enter the area of the pipe field joint as previously described.

Referring now to FIGS. 1, 5, 6, 11, 12, 17A and 17B, diesel engine 248 drives hydraulic pumps 250 and 256, as hereinabove described. The wheel drive pump 250 receives hydraulic fluid from reservoir 252 via line 255 and discharges the pressurized hydraulic fluid through lines 249 or 251 to pilot actuated valve 295. The motors 76 are preferably axial piston type hydraulic motors capable of almost instantaneous reversible operation. As hereinbefore described, squeeze pump 256 receives hydraulic fluid from reservoir 252 and delivers pressurized hydraulic fluid to the upper portion of squeeze cylinder 116 via lines 262 and 265, and valve 258, driving wheel assemblies 55, 57 and 61 into contact with the outer surface of pipe 29. When the hydraulic pressure in line 265 reaches a predetermined level, indicating that full squeeze pressure has been reached by cylinders 116, sequence valve 296 is actuated by hydraulic fluid via line 259 and passes pressurized fluid to valve 258 (not actuated) via line 297 and via line 298 to valve 295. The pilot pressure via line 298 actuates valve 295 and the wheel drive pressure is applied via lines 249 or 251 to motors 76 to drive the motors in the desired direction.

Hydraulic fluid pressure in output line 262 of the squeeze pump 256 is also applied to a pressure measuring device 283 and via line 282, valve 281 and lines 280 and 279 to brake 58. The squeeze pressure de-actuates brake 58, thereby allowing the wheels 75 to be driven by motors 76. As hereinbefore described, pressure measuring devices 283 and 285 monitor the hydraulic pressure in lines 263 and 251, respectively. If the hydraulic pressure in either of the lines drops below a predetermined minimum level, the measuring devices, 283 or 285, generate an electrical signal applied to solenoid actuated valve 281. Solenoid actuation of valve 281 disconnects line 282 from the squeeze pump 256, and connects line 294 to the fluid reservoir 252, thereby allowing the fluid in brake 58 to be drained via lines 279, 280 and 294 to the reservoir and permitting automatic mechanical actuation of brake 58 to stop the rotation of drive wheels 75. In this way the drive wheels are locked if there is a failure of the main squeeze or motor drive pressure.

The electrical output of pressure devices 283 and 285 are also applied via conductor 286 to energize an electrical motor 290. Motor 290 drives an auxiliary squeeze pump 292 which delivers pressurized fluid via line 291 to liens 262 and 265 to maintain the squeeze pressure on cylinders 116 in the event of squeeze pressure or wheel drive pressure failure. From the following, it may be seen that if the main squeeze pressure is lost in lines 263 and 265, brakes 58 will be actuated until the squeeze pressure in line 263 has been restored by the action of the auxiliary squeeze pump 292. However, if wheel pressure is lost in line 251, the squeeze pressure will be maintained but the brakes 58 will be set to lock wheels 78 and prevent the pipeline from being forced through the wheels and possibly lost overboard. If there is a catastrophic failure, i.e., the squeeze pressure and the wheel drive pressure are both lost simultaneously, the auxiliary squeeze pump 292 will immediately build up squeeze pressure to hold the pipeline in the tensioning machine while the brake 58 sets the wheels 78 to prevent the wheels from acting as mere unidirectional rollers and permitting loss of the pipe.

As hereinbefore mentioned, the output of hydraulic pump 256 is applied via lines 263 to a solenoid actuated two-way valve 258. Rollers 90 of the limit switch assemblies 80, 82 and 84 engage the outer surface of the axially moving pipe string 29. As may readily be seen in FIG. 5, one roller 90 of each limit switch assembly 80, 82, and 84 is spaced adjacent a roller 90 of an adjacent limit switch assembly and spaced fore and aft of the area where each tire contacts the surface of pipe 29. The two adjacent rollers 90, of separate limit switch assemblies are shown diagrammatically in FIG. 17A. As may be seen, the limit switches 222 and 222a, associated with adjacent rollers 90, are wired in parallel, so that if either roller moves into the field-joint area 30 of pipe 29 the associated switch is closed and an electrical circuit is closed via conductors 271 and 272 to valve 258 and via conductors 275 and 276 to valve 274. When valve 258 is actuated, it applies pressurized hydraulic fluid from pump 256 via lines 263, 264, and 239 to cylinder 116. The fluid pressure on piston 169 retracts piston rod 174 and the coupled drive unit and traction drive piston rod 174 and the coupled drive unit and traction drive wheel 78 thereby radially displacing the drive wheel and disengaging the traction drive wheel assemblies 55, 57, and 61 from frictional contact with the outer surface of pipe string 29 while the field-joint passes the assemblies.

At the same time that valve 258 operates cylinder 116 to retract the set of drive wheels associated with an adjacent pair of rollers 90, valve 274 is actuated. When valve 258 shifts the hydraulic pressure to cylinder 116 from line 265 to line 264, input pressure to sequence valve 296 is relieved via line 259, and the valve shuts off pilot pressure via line 298 to valve 295. However, since valve 274 has been actuated simultaneously, valve 274 opens and allows pilot fluid in line 298 to drain via lines 279 and 299 to the fluid reservoir 252. With pilot actuating fluid relieved from valve 295, the valve closes and shuts off fluid flow via lines 249 and 251, thus stopping motors 76. Accordingly, when the field-joint 30 approaches the wheels 78 from either direction, and one of the rollers 90 depresses into the field-joint area, the associated wheel assemblies 55, 57, and 61 are withdrawn from contact with pipe string 29 and drive pressure is disconnected from the retracted wheels 78. Of course, the same sequence of operation will occur for each set of drive wheels as the field joint 30 passes longitudinally through the machine. When the wheels at one station retract to pass the field joint 30, the remaining wheels in contact with the pipe maintain the desired tension.

When both associated rollers 90 have ridden out of the field-joint area 30, and both switches 222 and 222a have been opened, valves 258 and 274 are deactuated and the wheel drive assemblies 55, 57, and 61 are moved into engagement with pipe string 29. Simultaneously, sequence valve 296 operates valve 295 and drive wheel pressure is once again exerted on drive wheels 78.

When it is desired to displace the upper frame assembly 66, the traction drive wheels 78 are disengaged from the outer surface of pipe string 29 as hereinbefore described. A manually-actuated valve 260 permits hydraulic fluid from hydraulic pump 256 to be applied via lines 263, 267, and 269 to one input of the upper frame assembly traversing motor 108. Motor 108 drives the screw-jack mechanism 139 and 143, hereinabove described (see FIGS. 9 and 10), for traversing the upper frame assembly 66 laterally away from pipe string 29. Pipe string 29 is then free to be raised and removed from the frame of pipe tensioning apparatus 34. When it is desired to return the upper frame assembly 66 to its normal operating position, valve 260 is actuated for applying hydraulic fluid from pump 256 via lines 263, 267, and 268 to the traversing motor 108 which drives the screw-jack assemblies 139 and 143 in the opposite direction and returns the upper frame assembly 66 to the desired position. As soon as the upper frame assembly 66 has returned to its normal operating position, valve 260 is operated to its closed position. Traction wheels 78 are returned to frictional engagement with the surface of pipe string 29 as hereinbefore described by the action of the squeeze cylinder 116.

As hereinbefore described, preloaded load cell 104 is in physical contact with the frame of the pipe tensioning apparatus 34 and senses the stress differential between the frame and the vessel 20 in the direction of the payout of pipe string 29. This stress differential is directly related to the tension applied to the pipe string 29 by the traction wheel assemblies 55, 57, and 61. The load cell 104 may be any conventional type of strain gauge or load cell capable of measuring the loading stress between vessel 20 and the apparatus 34 and generating an electrical signal representative of the measured stress.

The output signal generated by load cell 104 is transmitted via conductor 273 to a pump control circuit 277. The output of the pump control circuit is applied via wire 270 to a servo valve 278 that controls the output of pump 250.

Figure 18:
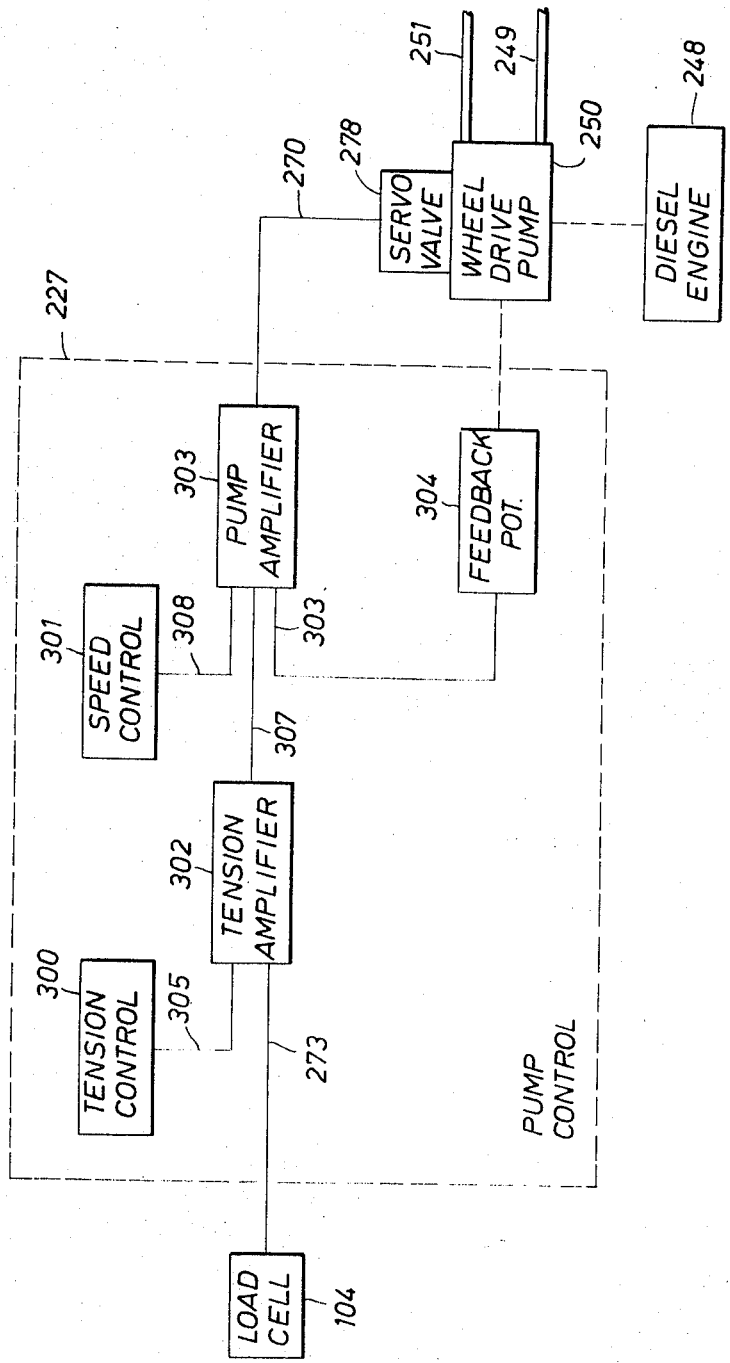
FIG. 18 is an electrical, schematic block diagram of the pump control circuit of the pipe tensioning apparatus according to the present invention.

Pump control circuit 277 is shown in greater detail in FIG. 18. A tension amplifier 302 receives the electrical signals from load cell 104 via conductor 273. A tension control circuit 300 is shown connected via conductor 305 as a second input to the tension amplifier 302. The output of the tension amplifier is applied via conductor 307 as an input to pump amplifier 303. A speed control circuit 301 is also connected via conductor 308 as a second input to amplifier 303. The output of pump amplifier 303 is then applied via conductor 270 to operate solenoid-actuated servo valve 278. As hereinabove mentioned, valve 278 controls the operation of pump 250 which applies pressurized hydraulic fluid to the drive motors via lines 249 and 251. A potentiometer 304 is mechanically linked to the yoke of pump 250 and applied a feedback correction signal via conductor 309 to pump amplifier 303.

The pipe tensioning machine is normally operated by utilizing control settings of the tension control 300, which may be any conventional means of setting a predetermined tension desired in the pipe and generating an electrical signal representative of the desired tension. The tension amplifier 302, which may be any conventional comparing amplifier circuit, compares the tension control signal via conductor 305 with the load cell signal via wire 273. If a difference exists, an error voltage is transmitted via conductor 307 to the pump amplifier 303. The pump amplifier compares the amplified error signal from amplifier 302 and the feedback signal from potentiometer 304 via line 309. The resulting error signal is amplified and applied to the servo valve to change the pump stroke to increase or reduce the hydraulic pressure output of the pump as applied out at lines 249 and 251. When the error signal output of pump amplifier 303 returns to zero, the pump pressure is maintained constant until a change in the pipe tension is measured by load cell 104 and a new error signal is generated.

Speed control 301 is used to manually control the speed and direction of pipe movement with no set tension on the pipeline desired. Such an occasion may be the initial start of pipelaying. Speed control 301 may conveniently be a manually controlled rheostat or any other suitable manual control for generating an appropriate error signal to be applied via conductor 308 to pump amplifier 303. The error signal is compared with the feedback signal from potentiometer 304 and an amplified error signal is applied via line 270 to servo valve 278 for controlling the pump 250 operation as hereinbefore described.

A backup system utilizing a full pressure compensated hydraulic control (not shown) is used to control the system in the event of electrical control failure.

The operation of the system has been described in terms of one three-wheel station. Of course, the operation of each additional wheel station is identical to that herein described. More than one prime mover 248 and wheel drive pump 250 may be utilized to increase the capacity of the system. In addition, an interlock system (not shown) is provided to prevent the wheels at more than one station from retracting simultaneously.

Numerous variations and modifications may obviously be made in the structure herein described without departing from the present invention. Accordingly, it should be clearly understood that the forms of the inventions herein described and shown in the figures of the accompanying drawings are illustrative only and are not intended to limit the scope of the invention.

What is claimed is:

1. Apparatus for tensioning a pipeline while laying the pipeline from a floating vehicle comprising
    frame means for axially accommodating the pipeline and said frame being suspended from said vehicle,
    a plurality of traction wheel stations disposed longitudinally in the pipe laying direction within said frame,
    a plurality of traction wheels at each traction wheel station to define a longitudinal track for said pipe in the pipe laying direction, said wheels being adapted for radial disposition around the coated pipeline to support and frictionally engage the outer surface thereof,
    driving means for birotationally driving said traction wheels in frictional engagement with said pipe,
    load determining means cooperating with said suspended frame means for determining the stress between said frame and said vehicle in the pipe laying direction, and
    electronic control means cooperating with said load determining means for birotationally controlling said driving means and maintaining a constant tension force on said pipe with respect to said vehicle in the pipe laying direction.

2. The apparatus as described in claim 1, wherein said frame means includes
    a first frame structure defining an elongated rack having a generally V-shaped opening centrally therethrough for axially accommodating the pipeline,
    a second frame structure defining an elongated support member attachable to the top of said first frame structure and adapted for transverse movement with respect thereto,
    support pedestals for suspending said first frame structure above the deck of said vehicle, and
    stabilizing means for limiting longitudinal and transverse movement of said first frame structure relative to said vehicle.

3. The apparatus as described in claim 1, wherein said driving means includes
    a plurality of hydraulic motors each of which is adapted for driving one of said traction wheels.

4. The apparatus as described in claim 1, wherein the load determining means comprises at least one load cell in operative contact with said first frame structure.

5. The apparatus as described in claim 2, wherein said apparatus further includes motor operated means for moving said second frame structure transversely with respect to said first frame structure and displacing said driving means and traction wheels mounted on said frame structure for allowing the upward removal of the pipe line from said first frame structure.

6. The apparatus as described in claim 2, wherein said apparatus further includes
locking means for locking said second frame structure to said first frame structure when said driving means and said traction wheels are positioned over the pipe for pipelaying operations.

7. The apparatus as described in claim 5, wherein said motor operated means includes
screw-jack means operably mounted for engaging said first and second frame structures, and
a hydraulic motor operably connected to said screw-jack means for driving said second frame structure transversely with respect to said first frame structure.

8. The apparatus of claim 1, wherein
said traction wheels are pneumatic tires and are disposed in sets of at least two traction wheels per set at each of said traction wheel stations, said traction wheels at each of said stations having their centers in a single plane transverse to the pipe laying direction,
said traction wheels in each set being disposed to contact the pipe at equidistant locations about the pipe surface.

9. The apparatus of claim 8 adapted for laying a continuous pipeline of welded pipe sections bearing a cement coating discontinuous at the welded section joints including
sensing means to detect the location of a section joint,
displacing means to sequentially withdraw said traction wheels at a single traction wheel station from contact with the pipe surface when the wheels at a single traction wheel station approach said section joints, and
means to return said traction wheels at each such traction wheel station into contact with the pipe surface when said section joint has passed the wheels of said station.

10. The apparatus as described in claim 9, wherein said sensing means includes
a plurality of rollers mounted on said frame means on either side of each traction wheel station for engaging the surface of the pipeline adjacent to and spaced from the portion of the pipeline surface engaged by the traction wheels of such station, and
signal means operably connected to each of said rollers for generating an electrical response when at least one of said rollers engages the termination and resumption of coating adjacent each pipe section joint as said pipe moves through the apparatus.

11. Apparatus for tensioning a continuous pipeline formed of welded coated pipe sections during the laying of the pipeline from a floating vehicle, comprising
frame means defining an elongated rack for longitudinally accommodating the pipeline,
means for suspending said frame means from said vehicle to permit limited relative movement between said frame means and said vehicle in the pipe laying direction,
a plurality of traction wheel stations disposed longitudinally in the pipelaying direction within said frame means,
a plurality of traction wheels at each traction wheel station in said frame means and adapted for radial disposition around the coated pipeline for frictionally engaging the outer surface thereof,
driving means for controlling the rotation of each of said traction wheels,
load determining means fixed with respect to said vehicle cooperating with said suspended frame means for determining the stress between said frame and said vehicle in the pipe laying direction,
control means responsive to said load determining means for controlling said driving means and maintaining the frictional engaging pressure of said traction wheels at a constant load, and
retracting means operatively connected to each of said traction wheels for radially retracting said traction wheels at a single traction wheel station from the surface of the pipeline when said wheels approach each of the welded pipe section joints of the pipeline.

12. The apparatus of claim 11, wherein said traction wheels are pneumatic tires and are disposed in sets of at least two traction wheels per set at each of said traction wheel stations, said traction wheels at each of said stations having their centers in a single plane transverse to the pipe laying direction, and said traction wheels being disposed to contact the pipe at equidistant locations about the pipe surface.

13. The apparatus of claim 12, including support means disposed beneath said pipe between said sets of pneumatic traction wheels to support the weight of said pipe.

14. The apparatus of claim 13, wherein said support means is a series of support rollers longitudinally disposed within said frame and spaced between said traction wheel stations.

15. The apparatus of claim 14, including three traction wheels in each set.

16. The apparatus of claim 15, wherein said three traction wheels at each of said stations are disposed equidistantly around said pipe with one of said wheels directly above said pipe.

17. The apparatus of claim 12 including two traction wheels in each set disposed in opposing relation above and below said pipe.

18. The apparatus described in claim 11 including
a hydraulic motor and a drive assembly for controlling the rotation of each of said traction wheels.

19. The apparatus of claim 18 including
a cage assembly for mounting each pneumatic gripping wheel and its associated hydraulic motor and drive assembly,
said cage assembly being slidably mounted with respect to said frame means to permit movement of said pneumatic gripping wheel perpendicular to the outer surface of said pipe.

20. The apparatus of claim 19 wherein said retracting means is a hydraulic cylinder adapted to move said cage assembly with respect to said frame to engage and disengage said pneumatic gripping wheel and said pipe.

21. The apparatus as described in claim 12, wherein said frame means includes
an upper elongated frame mounting an aligned series of pneumatic traction wheels directly above said pipeline attachable to the top of said lower frame and supported thereby,
a lower elongated frame mounting at least one additional aligned series of pneumatic traction wheels, said frame having a generally V-shaped opening centrally therethrough for longitudinally accommodating the pipeline, and
said upper frame being adapted for transverse movement with respect to said lower frame to permit upward removal of said pipe from said apparatus.

22. The apparatus as described in claim 21, wherein said means for suspending said frame from said vehicle for permitting limited relative movement between said frame and said vehicle in the pipe laying direction comprises
suspension means operatively connected between said lower frame and said vehicle for permitting longitudinal movement of said lower frame in the pipe laying direction, and
stabilizing means operatively connected between said lower frame and the vehicle for limiting said longitudinal movement of said first frame structure relative to said vehicle in the pipe laying direction.

23. The apparatus as described in claim 22, wherein the load determining means comprises a strain gauge in operative contact with said lower frame structure.

24. The apparatus as described in claim 12, wherein said retracting means includes sensing means adapted for contact with the outer surface of the pipeline adjacent either side of each set of pneumatic traction wheels at each station for detecting the approach of each of the welded pipe section joints as the pipeline moves longitudinally with respect to said upper and lower frames, and displacing means responsive to said sensing means for radially retracting said traction wheels from the surface of the pipeline.

25. The apparatus as described in claim 24, wherein said sensing means includes a plurality of rollers disposed on said lower frame on either side of each traction wheel station for engaging the surface of the pipeline adjacent to and spaced from the portion of the pipeline surface engaged by said traction wheels of such station, and actuating means operatively connected to each of said rollers for actuating said displacing means when one of said rollers engages the end of the coating adjacent each pipe section joint.

26. The apparatus as described in claim 23, wherein said displacing means comprises a plurality of hydraulic cylinders responsive to said actuating means, each of which is adapted for radially displacing one of said traction wheels and disengaging said traction wheel from the surface of the pipeline.

27. The apparatus as described in claim 21 including a displacing means for moving said upper frame transversely, said displacing means comprising screw-jack means operatively mounted for engaging said upper and lower frame, and a motor operatively connected to said screw-jack means for driving said upper frame transversely with respect to said lower frame.

28. The apparatus as described in claim 27 wherein said screw-jack means comprises a first screw-jack assembly transversely mounted to the top of the lower frame and operatively attached to the base of said upper frame, a second screw-jack assembly longitudinally spaced from said first screw-jack assembly and attached to the top of said lower frame and operatively connected to the base of said upper frame, and a shaft longitudinally connecting said first and second screw-jack assemblies for driving said assemblies synchronously.

29. The apparatus as described in claim 28, wherein said motor is mounted on said second frame and drives said first screw-jack assembly.

30. In combination with a pipe laying barge for laying submarine pipeline and a trailing stinger for at least partially supporting the pipeline to enable the pipe to assume a catenary curve shape between the lay barge and the submarine surface, a pipe tensioning device comprising frame means for axially accommodating the pipeline, said frame means suspended on the barge for limited movement relative to the barge in the pipe laying direction, a plurality of traction wheel stations deposed longitudinally in the pipe laying direction within said frame means, a plurality of traction wheels at each of said traction wheel stations defining a track for said pipe in the pipe laying direction, said wheels being adapted for radial disposition around the coated pipeline to support and frictionally engage the outer surface thereof, driving means for controlling the rotation of said gripping wheels, squeezing means for applying a substantially uniform radial pressure through said traction wheels to the surface of the pipe, load determining means cooperating with said frame means for determining the stress between the said frame and said vehicle in the pipe laying direction, and control means cooperating with said load determining means for controlling said driving means and maintaining the resistance to the movement of the pipeline through said frame means at a constant load.

31. The apparatus as described in claim 30, wherein said squeezing means includes regulating means cooperating with the uppermost of said radially disposed traction wheels to compensate for the weights thereof and provide substantially uniform squeezing pressure exerted on the pipeline through each of said wheels at each of said traction wheel stations.

32. The apparatus as described in claim 30, wherein said squeezing means comprises hydraulic cylinders operatively connected to each of the traction wheels at each of said traction wheel stations, hydraulic distribution means for supplying pressurized hydraulic fluid to said hydraulic cylinder, and a pressure regulator cooperating with said cylinders of the uppermost traction wheels to limit the flow of hydraulic fluid thereto for compensating for the weight of said uppermost wheels and providing substantially uniform squeezing pressure by each of said wheels at each of said traction wheel stations.

* * * * *